(12) United States Patent
Boggs et al.

(10) Patent No.: US 6,594,529 B1
(45) Date of Patent: Jul. 15, 2003

(54) PROGRAMMABLE LOGIC CONTROLLER METHOD, SYSTEM AND APPARATUS

(75) Inventors: Mark Steven Boggs, Johnson City, TN (US); Temple L. Fulton, Elizabethton, TN (US); Steve Hausman, Johnson City, TN (US); Gary McNabb, Unicoi, TN (US); Alan McNutt, Johnson City, TN (US); Steven W. Stimmel, Johnson City, TN (US)

(73) Assignee: Siemens Energy & Automation, Alpharetta, GA (US)

( * ) Notice: Subject to any disclaimer, the term of this patent is extended or adjusted under 35 U.S.C. 154(b) by 0 days.

(21) Appl. No.: 09/526,114

(22) Filed: Mar. 15, 2000

Related U.S. Application Data
(60) Provisional application No. 60/124,498, filed on Mar. 15, 1999.

(51) Int. Cl.[7] .................................................. G11C 7/10
(52) U.S. Cl. ...................... 700/12; 365/189.05; 710/52
(58) Field of Search ........................... 700/18, 19, 55, 700/14, 12; 710/58–61, 52, 54; 365/189.01, 189.05

Primary Examiner—Paul P. Gordon

(57) ABSTRACT

A programmable logic controller with enhanced and extended the capabilities. A digital input filter implement filters with considerable less logic by simulating the action of a capacitor being driven by a constant current source whose output voltage is sensed by a comparator with a large amount of hysterisis. A pulse catch circuit captures the input pulse even though the update occurs between scan cycles. A pulse output controller includes a hardware pipeline mechanism to allow for smooth, hardware-controlled transitions from wave-form to wave-form. A free port link allows the user to control the port either manually or by operation of a user program. In order to provide higher performance for communication using PPI protocol, the PLC includes a built-in protocol. An n-bit modem protocol ensures data integrity without use of a parity type data integrity system. A hide instruction protects proprietary software by encrypting the sensitive code and decrypting the code during compilation and, thereafter, re-encrypting the code. A system function call allows the user to create and/or download new PLC functions and implement them as PLC operating system functions. An STL status function debugs programs during run-time and while the program is executing. A micro PLC arrangement provides compact size and efficiency.

15 Claims, 40 Drawing Sheets

DIGITAL FILTER OPERATION DEFINITION

| INPUT POINT STATE | CURRENT COUNT | NEXT COUNT | PRESENT OUTPUT VALUE | NEXT OUTPUT VALUE |
|---|---|---|---|---|
| 0 (DECREMENTS COUNTER) | 0<br>n, where 3≥n>0<br>4<br>n, where 15≥n>4 | 0<br>n - 1<br>3<br>n - 1 | 0<br>0<br>1<br>1 | 0<br>0<br>0<br>1 |
| 1 (INCREMENTS COUNTER) | n, where 11>n≥0<br>11<br>n, where 14≥n>11<br>15 | n + 1<br>12<br>n + 1<br>15 | 0<br>0<br>1<br>1 | 0<br>1<br>1<br>1 |

| FREQUENCY | PERIOD | NUMBER OF COUNTS | DELAY TIME |
|---|---|---|---|
| 120 KHz | 8.33 μSEC | 12 | 0.1 ms |
| 60 KHz | 16.6 μSEC | 12 | 0.2 ms |
| 30 KHz | 33.3 μSEC | 12 | 0.4 ms |
| 15 KHz | 66.7 μSEC | 12 | 0.8 ms |
| 7.5 KHz | 133 μSEC | 12 | 1.6 ms |
| 3.75 KHz | 267 μSEC | 12 | 3.2 ms |
| 1.875 KHz | 533 μSEC | 12 | 6.4 ms |
| 937 KHz | 1067 μSEC | 12 | 12.8 ms |

| REGISTER VALUE | CORRESPONDING DELAY TIME |
|---|---|
| 00 | 0.2 ms |
| 01 | 0.4 ms |
| 02 | 0.8 ms |
| 03 | 1.6 ms[1] |
| 04 | 1.6 ms[1] |
| 05 | 3.2 ms |
| 06 | 6.4 ms |
| 07 | 12.8 ms |
| 08 TO FF | NO DELAY |

FIG. 12B

| \multicolumn{2}{|c|}{PULSE CATCH ENABLE REGISTERS} |
|---|---|
| ADDRESS | DESCRIPTION |
| 0002H | REGISTER NAME: IB0_Pulse_Catch_Enable_Register (IB0PCE)<br>SIZE: byte (8-bit)<br>ACCESS: read/write<br>RESET VALUE: 00H<br><br>7　　　　　　　　　　　　　　　　　　　　　　　　　　0<br>\| EN7 \| EN6 \| EN5 \| EN4 \| EN3 \| EN2 \| EN1 \| EN0 \|<br><br>ENx: 1 = ENABLES PULSE CATCH OPERATION ON INPUT POINT IB0.x<br>　　　0 = DISABLES PULSE CATCH OPERATION ON INPUT POINT IB0.x |
| 0003H | REGISTER NAME: IB1_Pulse_Catch_Enable_Register (IB1PCE)<br>SIZE: byte (8-bit)<br>ACCESS: read/write<br>RESET VALUE: 00H<br><br>7　　　　　　　　　　　　　　　　　　　　　　　　　　0<br>\| X \| X \| EN5 \| EN4 \| EN3 \| EN2 \| EN1 \| EN0 \|<br><br>ENx: 1 = ENABLES PULSE CATCH OPERATION ON INPUT POINT IB1.x<br>　　　0 = DISABLES PULSE CATCH OPERATION ON INPUT POINT IB1.x |

FIG. 12C

| REGISTER IB0PS: | READ OF THIS REGISTER RETURNS CIB0[7:0] AND RETRIGGERS PULSE CATCH CIRCUITS FOR IB0 INPUT POINTS | USED BY SW FOR INPUT UPDATE |
|---|---|---|
| REGISTER IB1PS: | READ OF THIS REGISTER RETURNS CIB1[5:0] AND RETRIGGERS PULSE CATCH CIRCUITS FOR IB1 INPUT POINTS | USED BY SW FOR INPUT UPDATE |
| REGISTER IB0PSNR: | READ OF THIS REGISTER RETURNS CIB0[7:0] AND LEAVES PULSE CATCH CIRCUITS UNAFFECTED | USED BY SW FOR IMMEDIATE ACCESS |
| REGISTER IB1PSNR: | READ OF THIS REGISTER RETURNS CIB1[5:0] AND LEAVES PULSE CATCH CIRCUITS UNAFFECTED | USED BY SW FOR IMMEDIATE ACCESS |

FIG. 12D

| \ | INPUT POINT STATUS REGISTERS |
|---|---|
| ADDRESS | DESCRIPTION |
| 0004H | REGISTER NAME: IB0_Input_Point_Status_Register (IB0PS)<br>SIZE: byte (8-bit)<br>ACCESS: read only<br>RESET VALUE: 00H<br><br>7 0<br>\| CI7 \| CI6 \| CI5 \| CI4 \| CI3 \| CI2 \| CI1 \| CI0 \|<br><br>CIx: CONTAINS CONDITIONED INPUT POINT STATE CIB0.x |
| 0005H | REGISTER NAME: IB1_Input_Point_Status_Register (IB1PS)<br>SIZE: byte (8-bit)<br>ACCESS: read only<br>RESET VALUE: 00H<br><br>7 0<br>\| X \| X \| CI5 \| CI4 \| CI3 \| CI2 \| CI1 \| CI0 \|<br><br>CIx: CONTAINS CONDITIONED INPUT POINT STATE CIB1.x. |
| 0006H | REGISTER NAME: IB0_Input_Point_Status_Register_No_Retrigger (IB0PSNR)<br>SIZE: byte (8-bit)<br>ACCESS: read only<br>RESET VALUE: 00H<br><br>7 0<br>\| CI7 \| CI6 \| CI5 \| CI4 \| CI3 \| CI2 \| CI1 \| CI0 \|<br><br>CIx: CONTAINS CONDITIONED INPUT POINT STATE CIB1.x |
| 0007H | REGISTER NAME: IB1_Input_Point_Status_Register_No_Retrigger (IB1PSNR)<br>SIZE: byte (8-bit)<br>ACCESS: read only<br>RESET VALUE: 00H<br><br>7 0<br>\| X \| X \| CI5 \| CI4 \| CI3 \| CI2 \| CI1 \| CI0 \|<br><br>CIx: CONTAINS CONDITIONED INPUT POINT STATE CIB0.x. |

| REGISTER NAME | VALID VALUE RANGE | |
|---|---|---|
| CYCLE TIME PRESET REGISTER<br>CYCLE TIME PIPELINE REGISTER | 2 TO 65535 | |
| DELTA CYCLE TIME REGISTER<br>DELTA CYCLE PIPELINE REGISTER | -32768 TO 32767 | |
| PULSE COUNT/WIDTH PRESET REGISTER<br>PULSE COUNT/WIDTH PIPELINE REGISTER | 1 TO $(2^{32}-1)$<br>PTO MODE | 0 TO 65535<br>PWM MODE |

C: DENOTES CONDITION

FIG. 16

```
cycle time counter = cycle time counter + 1;
IF (cycle time counter >= cycle time preset) THEN
BEGIN   //this is the CycleDone event
        --------
        pulse counter = pulse counter + 1;
        IF (pulse counter >= pulse count preset) THEN
        BEGIN   //this is the PTOComplete event
                --------
                assert INTxPLS signal, if PTOComplete interrupts are enabled;
                IF (pipeline loaded flag is set) THEN
                BEGIN
                        --------
                        transfer values from pipline registers into operating registers;
                        set pulse counter = 0;
                        clear pipeline loaded flag;
                        --------
                END
                ELSE   //pipeline loaded flag is not set
                BEGIN
                        --------
                        GOTO PTO Disabled state;   //disable the PLS block now
                        --------
                END
                ENDIF
                --------
        END ELSE   //not yet at PTOComplete
        BEGIN
                --------
                cycle time preset = cycle time preset + delta cycle time;
                IF (cycle time preset exceeds bounds) THEN
                BEGIN   //this is the AdderError event
                        --------
                        assert INTxPLS signal, if AdderError interrupts are enabled;
                        GOTO PTO Disabled state;   //disable the PLS block now
                        --------
                END
                ENDIF
                --------
        END
        ENDIF
        set cycle time counter = 0;
        --------
END
ENDIF IF (cycle time counter >=(1/2 * cycle time preset)) THEN
        PLSxOUT = 0;
ELSE    //output still in logic high portion of the current cycle
        PLSxOUT = 1;
ENDIF
```

FIG. 17

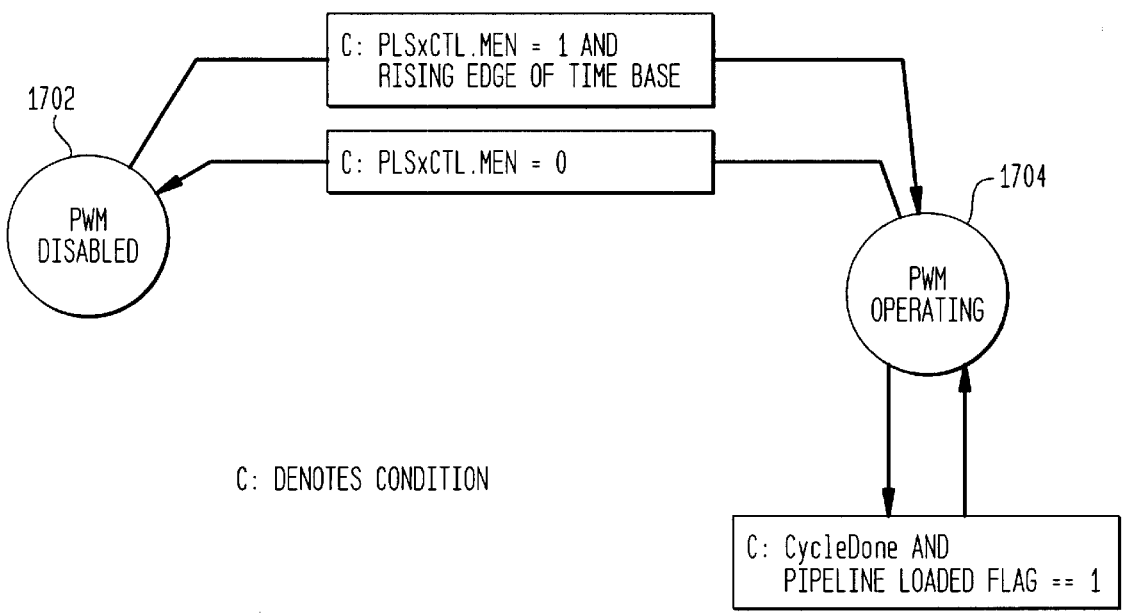

C: DENOTES CONDITION

FIG. 18

```
cycle time counter = cycle time counter + 1;
IF (cycle time counter >= cycle time preset) THEN
BEGIN  //this is the CycleDone event
        --------
        IF (pipeline loaded flag is set) THEN
        BEGIN
                --------
                transfer values from pipeline registers into operating registers;
                clear pipeline loaded flag;
                --------
        END
        ENDIF
        set cycle time counter = 0;
        --------
END
ENDIF IF (cycle time counter >= (pulse width preset)) THEN
        PLSxOUT = 0;
ELSE    //output still in logic high portion of the current cycle
        PLSxOUT = 1;
ENDIF
```

FIG. 19

| HIGH SPEED OPERATIONS | | | | |
|---|---|---|---|---|
| INSTRUCTION | MNEMONIC & OPERAND(S) | DESCRIPTION | STL STATUS ELEMENT | VALID OPERANDS |
| PULSE TRAIN OUTPUT PROFILE | PTOP t, n | WHEN S0 = 1, THE PTO PROFILE SPECIFIED IN THE TABLE FOR OUTPUT n IS EXECUTED. ENO <- S0 * /e | STK, <CURRENT STEP> | ENABLE: S0<br>TABLE: VB, IB, QB, MB,<br>(UI) SMB, SB, LB,<br>*VD, *AC<br>OUTPUT: KW<br>(UI) 0 - 1 |

DEFINITION OF THE TABLE FOR PTOP:

| BYTE OFFSET | SEGMENT | DESCRIPTION OF TABLE ENTRIES |
|---|---|---|
| 0 | | NUMBER OF PROFILE SEGMENTS (40 SEGMENTS MAXIMUM) |
| 1 | | CURRENT STEP NUMBER BEING EXECUTED |
| 2 | #1 | NUMBER OF STEPS (4 STEPS MINIMUM) |
| 4 | | STARTING CYCLE TIME FOR THIS SEGMENT (2 TO 65535 μSEC) |
| 6 | | CHANGE IN CYCLE TIME PER STEP (SIGNED VALUE)(0 TO 65535 μSEC) |
| 8 | #2 | NUMBER OF STEPS (4 STEPS MINUMUM) |
| 10 | | STARTING CYCLE TIME FOR THIS SEGMENT (2 TO 65535 μSEC) |
| 12 | | CHANGE IN CYCLE TIME PER STEP (SIGNED VALUE)(0 TO 65535 μSEC) |
| ⋮ | ⋮ | ⋮ |

FIG. 20

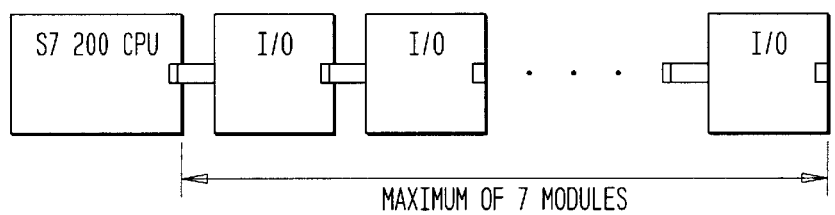

FIG. 21

| SIGNAL NAME | USE |
|---|---|
| EMD | EXPANSION MODULE DATA - A BI-DIRECTIONAL SIGNAL USED TO COMMUNICATE THE ADDRESS AND DATA TO AND FROM THE MODULE. |
| EMC[1:0] | EXPANSION MODULE CLOCKS - ONE CLOCK IS USED TO ACCESS EXPANSION I/O EXTERNAL TO THE PLC, WHILE THE OTHER IS USED TO ACCESS I/O THAT IS LOCAL TO THE PLC THAT DOES NOT CONNECT DIRECTLY TO THE ASIC. |
| XA_OD | ADDRESS/OUTPUT DISABLE - A DUAL FUNCTION SIGNAL USED TO RESET THE STATE MACHINE IN THE MODULES ON THE FIRST CLOCK OF EACH ACCESS CYCLE (ACTIVE LOW) AND USED TO INDICATE OUTPUT DISABLE WHEN A FATAL ERROR HAS BEEN DETECTED (ACTIVE LOW FOR AN RC TIME CONSTANT). |
| EMDDIR | EXPANSION MODULE DATA DIRECTION - THIS SIGNAL INDICATES THE DIRECTION OF DATA FLOW ON THE EMD SIGNAL LINE. 0 - DATA IS DRIVEN BY THE MODULE TO THE PLC 1 - DATA IS DRIVEN BY THE PLC TO THE MODULE |
| EMA[2:0] | ESPANSION MODULE ADDRESS - THESE SIGNALS ARE DAISY CHAINED FROM PLC TO MODULE TO MODULE. THE VALUE INPUT TO A MOCULE BECOMES THAT MODULE'S ADDRESS. THE MODULE WILL OUTPUT ITS ADDRESS PLUS ONE TO THE NEXT MODULE. THE PLC DRIVES THESE SIGNALS TO 0 SO THAT THE MODULE CONNECTED TO THE PLC HAS THE ADDRESS OF 0. |
| +5V | 5 VOLT POWER SUPPLY - TWO SIGNALS CARRY +5 VOLTS. |
| GND | POWER SUPPLY RETURN - TWO SIGNALS CARRY GROUND. |

FIG. 23

| REFERENCE DESIGNATOR | COMPONENT VALUE/TYPE | COMPONENT DESCRIPTION |
|---|---|---|
| IC1 | 74ABT125/74ABT126 | TRI-STATE BUFFER |
| CR1 | TVS 5.6V ZENER | DIODE |
| R1 | 4.7K ohm | RESISTOR |
| R2 | 110 ohm | RESISTOR |
| R3 | 220 ohm | RESISTOR |
| R4 | 22 ohm | RESISTOR |
| C1 | 0.1 µF | CAPACITOR |
| C2 | 100pF | CAPACITOR |

FIG. 24

| SIGNAL NAME | DRIVING DEVICE | DRIVE LEVELS | | | | RECEIVE LEVELS | |
|---|---|---|---|---|---|---|---|
| | | $V_{OL}$ (VOLTS) (MAX) | $I_{OL}$ (mA) (MIN) | $V_{OH}$ (VOLTS) (MAX) | $I_{OH}$ (mA) (MIN) | $V_{IL}$ (VOLTS) (MAX) | $V_{IH}$ (VOLTS) (MIN) |
| EMA[2:0] | MODULE | 0.5 | 3.0 | 2.4 | -3.0 | 0.8 | 2.0 |
| XA_OD | CPU | 0.55 | 64.0 | 2.0 | -32.0 | 0.8 | 2.0 |
| EMC | CPU | 0.55 | 64.0 | 2.0 | -32.0 | 0.8 | 2.0 |
| EMD | CPU | 0.55 | 64.0 | 2.0 | -32.0 | 0.8 | 2.0 |
| | MODULE | 0.55 | 64.0 | 2.0 | -32.0 | 0.8 | 2.0 |

FIG. 27

|   | a | b | c | d | e |
|---|---|---|---|---|---|
| P0 | BIT 0 | BIT 2 | BIT 4 | BIT 6 | BIT 7 |
| P1 | BIT 1 | BIT 2 | BIT 3 | BIT 5 | BIT 7 |
| 5 BIT ODD PARITY = !( ((a xor b) xor (c xor d) xor e ||||||

FIG. 28

| PLC TYPE | PORT 0 | PORT 1 |
|---|---|---|
| CPU 212 | 256 | - |
| CPU 214 | 256 | - |
| CPU 215/216 | 256 | 256 |

FIG. 29

| INTERRUPTS ||||  |
|---|---|---|---|---|
| INSTRUCTION | MNEMONIC & OPERAND(S) | DESCRIPTION | STL STATUS ELEMENT | VALID OPERANDS |
| PASS TOKEN | PASS | USER PROGRAM HAS COMPLETED ITS USE OF THE TOKEN HOLD PERIOD AND IS RETURNING CONTROL TO THE SYSTEM. | STK |  |

FIG. 30B

| SM BIT DEFINITION (READ/WRITE) | |
|---|---|
| SM BITS | DESCRIPTION |
| SM30 | PORT 0: COMMUNICATION PORT USAGE<br><br>    MSB                     LSB<br>    7                           0<br><br>SMB30 \| p \| p \| d \| r \| r \| r \| m \| m \|<br><br>pp (PARITY)       d(DATA BITS/CHAR)    rrr(BAUD RATE)    mm(PROTOCOL)<br>'00' - NO PARITY   '0' - 8 BITS/CHAR    '000' - 38,400    '00' - PPI SLAVE (DEFAULT)<br>'01' - EVEN PARITY '1' - 7 BITS/CHAR    '001' - 19,200    '01' - FREEPORT<br>'10' - NO PARITY                            '010' - 9600      '10' - PPI MASTER<br>'11' - ODD PARITY                       '011' - 4800      '11' - RESERVED (PPI SLAVE)<br>                                                          '100' - 2400<br>                                                          '101' - 1200<br>                                                          '110' - 600<br>                                                          '111' - 300<br><br>WHEN THE USER SELECTS THE CODE mm = 10 (PPI MASTER), THE PLC WILL BECOME A MASTER ON THE NETWORK ALLOWING THE NETR AND NETW INSTRUCTIONS TO BE EXECUTED. BITS 2 THROUGH 7 ARE IGNORED IN PPI MODES. IN PPI MASTER MODE WITH THE TOKEN ACQUIRED INTERRUPT ENABLED, THESE BITS ARE USED TO SETUP THE UART PROIR TO TRANSFERRING CONTROL TO THE USER'S PROGRAM. |
| SM130 | PORT 0: COMMUNICATION PORT USAGE (CPU 216 ONLY)<br><br>    MSB                     LSB<br>    7                           0<br><br>SMB130 \| p \| p \| d \| r \| r \| r \| m \| m \|<br><br>pp (PARITY)       d(DATA BITS/CHAR)    rrr(BAUD RATE)    mm(PROTOCOL)<br>'00' - NO PARITY   '0' - 8 BITS/CHAR    '000' - 38,400    '00' - PPI SLAVE (DEFAULT)<br>'01' - EVEN PARITY '1' - 7 BITS/CHAR    '001' - 19,200    '01' - FREEPORT<br>'10' - NO PARITY                            '010' - 9600      '10' - PPI MASTER<br>'11' - ODD PARITY                       '011' - 4800      '11' - RESERVED (PPI SLAVE)<br>                                                          '100' - 2400<br>                                                          '101' - 1200<br>                                                          '110' - 600<br>                                                          '111' - 300<br><br>WHEN THE USER SELECTS THE CODE mm = 10 (PPI MASTER), THE PLC WILL BECOME A MASTER ON THE NETWORK ALLOWING THE NETR AND NETW INSTRUCTIONS TO BE EXECUTED. BITS 2 THROUGH 7 ARE IGNORED IN PPI MODES. IN PPI MASTER MODE WITH THE TOKEN ACQUIRED INTERRUPT ENABLED, THESE BITS ARE USED TO SETUP THE UART PROIR TO TRANSFERRING CONTROL TO THE USER'S PROGRAM. |

FIG. 30C

| \multicolumn{2}{|l|}{SM BIT DEFINITION (READ/WRITE) (CONTINUED)} |
|---|---|
| SM BITS | DESCRIPTION |
| SM87 | PORT 0: RECEIVE MESSAGE CONTROL BYTE, (CPU 212/214/216)<br><br>MSB                                  LSB<br>7                                     0<br><br>\| en \| sc \| ec \| il \| c/m \| tmr \| bk \| 0 \|<br><br>en: ENABLE/DISABLE RECEIVE MESSAGE BIT IS CHECKED EACH TIME THE RCV INSTRUCTION IS EXECUTED. IF THIS BIT IS A "0", THEN THE RECEIVE MESSAGE FUNCTION IS DISABLED. IF THIS BIT IS A "1", THEN THE RECEIVE MESSAGE FUNCTION IS ENABLED.<br><br>sc: 0 - IGNORE SMB88; 1 - USE THE VALUE OF SMB88 TO DETECT START OF MESSAGE<br><br>ec: 0 - IGNORE SMB89; 1 - USE THE VALUE OF SMB89 TO DETECT END OF MESSAGE<br><br>il: 0 - IGNORE SMW90; 1 - USE THE VALUE OF SMW90 TO DETECT AN IDLE LINE CONDITION[1]<br><br>c/m: 0 - USE TIMER AS AN INTER-CHARACTER TIMER; 1 - USE TIMER AS A MESSAGE TIMER<br><br>tmr: 0 - IGNORE SMW92; 1 - TERMINATE RECEIVE IF THE TIME PREIOD IN SMW92 IS EXCEEDED<br><br>bk: 0 - IGNORE BREAK CONDITIONS; 1 - USE BREAK CONDITION AS START OF MESSAGE DETECTION<br><br>[1]BY SETTING THE sc AND bk BITS TO 0 AND THE en, il, c/m AND tmr BITS TO 1 WITH AN IDLE LINE TIMER VALUE OF ZERO, SMW92 WILL BE USED TO TIME OUT THE RCV INSTRUCTION WITHOUT RECEIVING ANY CHARACTERS. IF THE TIMER IS NOT USED (tmr = 0), THEN ANY CHARACTER RECEIVED WILL BE USED AS START OF MESSAGE.<br><br>THE BITS OF THE MESSAGE INTERRUPT CONTROL BYTE ARE USED TO DEFINE THE CRITERIA BY WHICH THE MESSAGE IS IDENTIFIED. BOTH START OF MESSAGE AND END OF MESSAGE CRITERIA ARE DEFINED. TO DETERMINE THE START OF A MESSAGE EITHER OF TWO SETS OF LOGICALLY ANDED START OF MESSAGE CRITERIA MUST BE TRUE AND MUST OCCUR IN SEQUENCE (IDLE LINE FOLLOWED BY START CHARACTER OR BREAK FOLLOWED BY START CHARACTER). TO DETERMINE THE END OF A MESSAGE THE ENABLED END OF MESSAGE CRITERIA ARE LOGICALLY Ored. THE EQUATIONS FOR START AND STOP CRITERIA ARE GIVEN BELOW:<br>$$\text{Start of Message} = il * sc + bk * sc$$<br>$$\text{End of Message} = ec + tmr + \text{maximum character count reached}$$<br><br>NOTE: RECEIVE WILL AUTOMATICALLY BE TERMINATED BY AN OVERRUN OR A PARITY ERROR (IF ENABLED). |
| SM88 | PORT 0: START OF MESSAGE CHARACTER. (CPU 212/214/216) |
| SM89 | PORT 0: END OF MESSAGE CHARACTER. (CPU 212/214/216) |
| SM90 SM91 | PORT 0: IDLE LINE TIME PERIOD GIVEN IN MILLISECONDS. THE FIRST CHARACTER RECEIVED AFTER THE IDLE LINE TIME HAS EXPIRED IS THE START OF A NEW MESSAGE. SM90 IS MSB.<br>(CPU 212/214/216) |
| SM92 SM93 | PORT 0: INTER-CHARACTER/MESSAGE TIMER TIMEOUT VALUE GIVEN IN MILLISECONDS. IF THE TIME PERIOD IS EXCEEDED, THE RECEIVE MESSAGE IS TERMINATED. SM92 IS MSB. (CPU 212/214/216) |
| SM94 | PORT 0: MAXIMUM NUMBER OF CHARACTERS TO BE RECEIVED (1 TO 255 BYTES) (CPU 212/214/216) |

FIG. 30D

| SM BIT DEFINITION (READ/WRITE) (CONTINUED) | |
|---|---|
| SM BITS | DESCRIPTION |
| SM187 | PORT 1: MESSAGE INTERRUPT CONTROL BYTE. (CPU 216 ONLY)<br><br>```
MSB                                         LSB
 7                                           0
+----+----+----+----+-----+-----+----+----+
| en | sc | ec | il | c/m | tmr | bk | 0  |
+----+----+----+----+-----+-----+----+----+
```<br><br>en: ENABLE/DISABLE RECEIVE MESSAGE BIT IS CHECKED EACH TIME THE RCV INSTRUCTION IS EXECUTED. IF THIS BIT IS A "0", THEN THE RECEIVE MESSAGE FUNCTION IS DISABLED. IF THIS BIT IS A "1", THEN THE RECEIVE MESSAGE FUNCTION IS ENABLED.<br><br>sc: 0 - IGNORE SMB188; 1 - USE THE VALUE OF SMB188 TO DETECT START OF MESSAGE<br><br>ec: 0 - IGNORE SMB189; 1 - USE THE VALUE OF SMB189 TO DETECT END OF MESSAGE<br><br>il: 0 - IGNORE SMW190; 1 - USE THE VALUE OF SMW190 TO DETECT AN IDLE CONDITION[1]<br><br>c/m: 0 - USE TIMER AS AN INTER-CHARACTER TIMER; 1 - USE TIMER AS A MESSAGE TIMER<br><br>tmr: 0 - IGNORE SMW192; 1 - TERMINATE RECEIVE IF THE TIME PREIOD IN SMW192 IS EXCEEDED<br><br>bk: 0 - IGNORE BREAK CONDITIONS; 1 - USE BREAK CONDITION AS START OF MESSAGE DETECTION<br><br>[1]BY SETTING THE sc AND bk BITS TO 0 AND THE en, il, c/m AND tmr BITS TO 1 WITH AN IDLE LINE TIMER VALUE OF ZERO, SMW192 WILL BE USED TO TIME OUT THE RCV INSTRUCTION WITHOUT RECEIVING ANY CHARACTERS. IF THE TIMER IS NOT USED (tmr = 0), THEN ANY CHARACTER RECEIVED WILL BE USED AS START OF MESSAGE.<br><br>THE BITS OF THE MESSAGE INTERRUPT CONTROL BYTE ARE USED TO DEFINE THE CRITERIA BY WHICH THE MESSAGE IS IDENTIFIED. BOTH START OF MESSAGE AND END OF MESSAGE CRITERIA ARE DEFINED. TO DETERMINE THE START OF A MESSAGE EITHER OF TWO SETS OF LOGICALLY ANDED START OF MESSAGE CRITERIA MUST BE TRUE AND MUST OCCUR IN SEQUENCE (IDLE LINE FOLLOWED BY START CHARACTER OR BREAK FOLLOWED BY START CHARACTER). TO DETERMINE THE END OF A MESSAGE THE ENABLED END OF MESSAGE CRITERIA ARE LOGICALLY Ored. THE EQUATIONS FOR START AND STOP CRITERIA ARE GIVEN BELOW:<br><br>$\quad$ Start of Message = il * sc + bk * sc<br><br>$\quad$ End of Message = ec + tmr + maximum character count reached<br><br>NOTE: RECEIVE WILL AUTOMATICALLY BE TERMINATED BY AN OVERRUN OR A PARITY ERROR (IF ENABLED). |
| SM188 | PORT 1: START OF MESSAGE CHARACTER. (CPU 216 ONLY) |
| SM189 | PORT 1: END OF MESSAGE CHARACTER. (CPU 216 ONLY) |
| SM190<br>SM191 | PORT 1: IDLE LINE TIME PERIOD GIVEN IN MILLISECONDS. THE FIRST CHARACTER RECEIVED AFTER THE IDLE LINE TIME HAS EXPIRED IS THE START OF A NEW MESSAGE. SM190 IS MSB. (CPU 216 ONLY) |
| SM192<br>SM193 | PORT 1: INTER-CHARACTER/MESSAGE TIMER TIMEOUT VALUE GIVEN IN MILLISECONDS. IF THE TIME PERIOD IS EXCEEDED, THE RECEIVE MESSAGE IS TERMINATED. SM192 IS MSB. (CPU 216 ONLY) |
| SM194 | PORT 1: MAXIMUM NUMBER OF CHARACTERS TO BE RECEIVED (1 TO 255 BYTES) (CPU 216 ONLY) |

FIG. 30E

| PLC TYPE | PORT 0 | | | PORT 1 | | |
|---|---|---|---|---|---|---|
| | NUMBER OF CONNECTIONS | | BUFFER SIZE | NUMBER OF CONNECTIONS | | BUFFER SIZE |
| | TOTAL | RESERVED | (BYTES) | TOTAL | RESERVED | (BYTES) |
| CPU 221 | 4 | 1 - PG<br>1 - OP | 128/256 | - | - | - |
| CPU 222 | 4 | 1 - PG<br>1 - OP | 128/256 | - | - | - |
| CPU 224 | 4 | 1 - PG<br>1 - OP | 128/256 | - | - | - |
| CPU 226 | 4 | 1 - PG<br>1 - OP | 128/256 | 4 | 1 - PG<br>1 - OP | 128/256 |

FIG. 32A

| PROGRAM CONTROL FUNCTIONS | | | | |
|---|---|---|---|---|
| INSTRUCTION | MNEMONIC & OPERAND(S) | DESCRIPTION | STL STATUS ELEMENT | VALID OPERANDS |
| HIDE | HIDE n, a, p | THE HIDE LABEL MARKS THE START OF A BLOCK OF n INSTRUCTIONS THAT ARE ENCRYPTED USING THE PASSWORD, p, WHEN a IS NON-ZERO. | STK, SMB1 | ENABLE: NONE<br>n:    KW(2 BYTES)<br>(UI)<br>a:    KW(2 BYTES)<br>(UI)<br>p:    KD(4 BYTES)<br>(UI) |

FIG. 33A

| PROGRAM CONTROL FUNCTIONS | | | | |
|---|---|---|---|---|
| INSTRUCTION | MNEMONIC & OPERAND(S) | DESCRIPTION | STL STATUS ELEMENT | VALID OPERANDS |
| SYSTEM FUNCTION CALL | SFC  f,s, #_parms, p0,p1,p2,... | WHEN S0 = 1, EXECUTE THE SYSTEM FUNTION IDENTIFIED BY f AND THE SUB-FUNCTION IDENTIFIED BY s. | STK, SMB1, \<p0>, \<p1>, \<p2>,... | ENABLE: S0<br>f:      KW<br>(UI)    0-65536<br>s:      KW<br>(UI)    0-65536<br><br>#parms: KB<br>(UI)    0-16<br><br>p0,...: Bit,Byte,Word, Dword<br>Bit    V,I,Q,M,SM,S, T,C,L<br>Byte   VB,IB,QB,MB, SMB,SB,KB,LB<br>Word   VW,T,C,IW, QW,MW,SMW, SW,LW,KW<br>Dword  VD,ID,QD,MD, SMD,SD,HC, LD,KD,&VB, &IB,&QB,&MB, &T,&C,&SB<br><br>NOTE: CONSTANTS AND ADDRESS POINTER SPECIFICATIONS ARE NOT ALLOWED FOR OUTPUT OR INPUT/OUTPUT PARAMETERS. |

| INSTRUCTION ADDRESS OF WINDOW START | | | | | | | | 2 BYTES |
|---|---|---|---|---|---|---|---|---|
| LENGTH OF STATUS DATA FOR 1ST INSTRUCTION | | | | | | | | 1 BYTE |
| V | ENO | SCR | S4 | S3 | S2 | S1 | S0 | 1 BYTE |
| STL STATUS DATA | | | | | | | | n BYTES |
| LENGTH OF STATUS DATA FOR 2ND INSTRUCTION | | | | | | | | 1 BYTE |
| V | ENO | SCR | S4 | S3 | S2 | S1 | S0 | 1 BYTE |
| STL STATUS DATA | | | | | | | | n BYTES |
| ⋮ | | | | | | | | |

FIG. 34D

| | BASIC INSTR. | COMPILED TO | BYTES | CYCLES |
|---|---|---|---|---|
| 1 | LD | RLC A<br>MOV C,<BIT> | 1<br>2 | 1<br>1 |
| 2 | LDN | RLC A<br>MOV C,<BIT><br>CPL C | 1<br>2<br>1 | 1<br>1<br>1 |
| 3 | A | ANL C,<BIT><br>NOP | 2<br>1 | 2<br>1 |
| 4 | AN | ANL C,/<BIT><br>NOP | 2<br>1 | 2<br>1 |
| 5 | O | ORL C,<BIT><br>NOP | 2<br>1 | 2<br>1 |
| 6 | ON | ORL C,/<BIT><br>NOP | 2<br>1 | 2<br>1 |
| 7 | = | MOV <BIT>,C<br>NOP | 2<br>1 | 2<br>1 |
| 8 | ALD | ANL C,ACC.0<br>RR A | 2<br>1 | 2<br>1 |
| 9 | OLD | ORL C,ACC.0<br>RR A | 2<br>1 | 2<br>1 |
| 10 | NOT | CPL C<br>NOP<br>NOP | 1<br>1<br>1 | 1<br>1<br>1 |
| 11 | LPS | RL A<br>MOV ACC.0,A | 1<br>2 | 1<br>2 |
| 12 | LPP | RRC A<br>NOP<br>NOP | 1<br>1<br>1 | 1<br>1<br>1 |
| 13 | LRD | MOV C,ACC.0 | 2 | 2 |
| 14 | RET | RET<br>NOP<br>NOP | 1<br>1<br>1 | 2<br>1<br>1 |
| 15 | INT | CLR A<br>NOP<br>NOP | 1<br>1<br>1 | 1<br>1<br>1 |
| 16 | END | JNC $+0<br>RET | 2<br>1 | 2<br>2 |
| 17 | CRETI | JNC $+0<br>RET | 2<br>1 | 2<br>2 |

| HOUSING | HEIGHT | WIDTH | DEPTH |
|---|---|---|---|
| CPU 221 | 80 mm | 90 mm | 62 mm |
| CPU 222 | 80 mm | 90 mm | 62 mm |
| CPU 224 | 80 mm | 120.5 mm | 62 mm |
| CPU 226 | 80 mm | 190 mm | 62 mm |
| 8 POINT I/O MODULE | 80 mm | 46 mmm | 62 mm |
| 16 POINT I/O MODULE | 80 mm | 71.2 mm | 62 mm |
| 32 POINT I/O MODULE | 80 mm | 125 mm | 62 mm |
| INTELLIGENT MODULE | 80 mm | 90 mm | 62 mm |

PROGRAMMABLE LOGIC CONTROLLER METHOD, SYSTEM AND APPARATUS

This Application claims the benefit of Provisional Application Ser. No. 60/124,498, filed Mar. 15, 1999.

BACKGROUND

1. Field of the Invention

The present invention relates to a programmable logic controller (PLC).

2. Related Information

Programmable logic controllers (PLC's) are a relatively recent development in process control technology. As a part of process control, a PLC is used to monitor input signals from a variety of input points (input sensors) which report events and conditions occurring in a controlled process. For example, a PLC can monitor such input conditions as motor speed, temperature, pressure, volumetric flow and the like. A control program is stored in a memory within the PLC to instruct the PLC what actions to take upon encountering particular input signals or conditions. In response to these input signals provided by input sensors, the PLC derives and generates output signals which are transmitted via PLC output points to various output devices, such as actuators and relays, to control the process. For example, the PLC issues output signals to speed up or slow down a conveyer, rotate the arm of a robot, open or close a relay, raise or lower temperature as well as many other possible control functions too numerous to list.

The input and output points referred to above are typically associated with input modules and output modules, respectively. Input modules and output modules are collectively referred to as I/O modules herein. Those skilled in the art alternatively refer to such I/O modules as I/O cards or I/O boards. These I/O modules are typically pluggable into respective slots located on a backplane board in the PLC. The slots are coupled together by a main bus which couples any I/O modules plugged into the slots to a central processing unit (CPU). The CPU itself can be located on a card which is pluggable into a dedicated slot on the backplane of the PLC.

FIG. 36 shows one typical conventional programmable logic controller system as system 3610. System 10 includes a host programmable logic controller 3615 coupled by a field bus 3620 to a bus interface unit 3625. Bus interface unit 3625 couples and interfaces field bus 3620 to a local bus 3630 which includes a plurality of I/O terminal blocks 3635. I/O terminal blocks 3635 are coupled to respective I/O modules 3640 as shown in FIG. 1.

In system 3610, computational processing is performed by the host programmable logic controller 3615. In other words conditions are sensed at I/O modules 3640 and input data is derived therefrom. The input data is transferred through bus interface unit 3625 and field bus 3620 to host programmable logic controller 3615. Host programmable logic controller 3615 acts on the input data according to a control program stored in host PLC 3615. Host programmable logic controller 3615 processes the input data and produces output data in response thereto. The output data is transferred through field bus 3620, bus interface unit 3625, local bus 3630 to one or more I/O modules 3640. In response to the output data, the I/O module receiving the output data controls an output device coupled to the I/O module. I/O termination blocks are provided for coupling the I/O modules 3640 to the bus interface unit 3625.

The PLC may be arranged in a master/slave network as shown in FIG. 37a. In the figure, the master/slave control system includes a master PLC(M) and a plurality of remote slave units RSUs(R1–Rn). As shown therein, the master PLC(M) including a master PLC, a data link, and an I/O module, controls its own I/O connection points using a program and a communication parameter which are set by a user, and also controls the respective I/O connection points for the remote slave units R1–Rn. Each of the plurality of RSUs(R1–Rn) has at least one I/O module, and carries out a data communication with the master PLC(M) through a communication cable, and accordingly controls its own I/O module. The RSUs may be PLCs acting as slaves.

With reference to FIG. 37b, the PLC and each of the RSUs include: a MODEM 3710 for carrying out a communication between the master PLC(M) and the RSUs via a communication cable; a receive/transmit module 3711 for exchanging data with the master PLC(M) according to a predetermined protocol; a receive/transmit buffer 3712 for temporarily storing therein the data for the exchange; an output data storage unit 3713 for storing therein the data which are to be transmitted from the master PLC(M) to an input/output module 3716; an input data storage unit 3714 for storing therein the data which are to be transmitted from the input/output module 3716 to the master PLC(M); and an input/output control module 3715 for controlling a data transmission between the data storage units 3713, 3714 and the input/output module 3716.

In operation, the data link in the master PLC(M) is a data linking device attached to the master PLC(M), which operates as a master unit in the related network, and which obtains an initiative of the data communication. The data link is able to set a maximum number N of RSUs. The RSU sets each number of its own and the master PLC(M), and receives a communication directly from the master PLC(M) for thereby carrying out a data transmission. The data link in the master PLC(M) sequentially selects the RSUs(R1–Rn) and carries out a data receiving/transmitting operation. For example, when the data outputted from the master PLC(M) is applied through the communication cable and the MODEM 3710 to the RSU(R1), the applied data passes through the receive/transmit buffer 3712 and the receive/transmit module 3711, and is stored in the output data storage unit 3713. The data stored in the output data storage unit 3713 is outputted to the input/output module 3716 in accordance with the control of the input/output control module 3715. The external control target data read from the input/output module 3716 of the remote slave unit R1 is stored in the input data storage unit 3714 in accordance with the control of the input/output control module 3715. The data stored in the input data storage unit 3714 is transmitted through the receive/transmit buffer 3712 and the receive/transmit module 3711 to the master PLC(M).

The present invention provides new features that enhance and extend the capability of the conventional PLC.

OBJECTS AND SUMMARY OF THE INVENTION

It is an object of the present invention to enhance and extend the capability of the PLC.

It is another object of the invention to provide a digital input filter to enhance and extend the input capability of the PLC.

It is still another object of the invention to provide a pulse catch circuit to enhance and extend the pulse catching capability of the PLC.

It is yet another object of the invention to provide a pulse output controller to enhance and extend the output capability of the PLC.

It is a further an object of the invention to provide a free port link to enhance and extend the portability of the PLC.

It is still a further object of the invention to provide a protocol for modem communication to enhance and extend the connectivity of the PLC.

It is yet further an object of the invention to provide a hide instruction to enhance and extend the integration of the PLC with external programming applications.

It is still an additional object of the invention to provide a system function call to enhance and extend the function call capability of the PLC.

It is an additional object of the invention to provide an STL status to enhance and extend the status acquisition capability of the PLC.

It is yet and additional object of the invention to provide a micro PLC with an enhanced and extended capability.

In accordance with the foregoing objectives, the present invention provides a programmable logic controller with enhances and extended the capabilities.

In one aspect of the invention, a digital input filter is provided. The digital input filter simulates the action of a capacitor being driven by a constant current source whose output voltage is sensed by a comparator with a large amount of hysterisis. The digital filter implements input filters with considerably less logic.

In another aspect of the invention, a pulse catch circuit is provided. The pulse catch circuit captures the input pulse even though the update occurs between scan cycles.

In yet another aspect of the invention, a pulse output controller is provided. The pulse output controller smoothly transitions from one PTO or PWM wave-form to another. The pulse output controller includes a hardware pipeline mechanism to allow for smooth, hardware-controlled transitions from wave-form to wave-form.

In a still another aspect of the invention, a free port link is provided. The free port link allows the user to control the port either manually or by operation of a user program. In order to provide higher performance for communication using PPI protocol, a built-in protocol selection option is provided.

In still another aspect of the invention, a protocol for modem communication is provided. In a particular arrangement, the modem protocol supports communications over standard 10-bit, full duplex modems. The protocol uses a novel technique to ensure data integrity without use of a parity type data integrity system.

In a further aspect of the invention, a hide instruction is provided. The hide instruction provides for the protection of proprietary software by encrypting the sensitive code and decrypting the code during compilation and, thereafter, re-encrypting the code.

A still further aspect of the invention provides a system function call. The system function call allows the user to create and/or download new PLC functions and implement them as PLC operating system functions.

A yet further aspect of the invention is to provide an STL status function. The STL status function allows the user to debug programs during run-time and while the program is executing.

A quite further aspect of the invention is to provide the PLC in a micro PLC arrangement.

These and other objects of the invention will be readily understood from the following description of the figures.

BRIEF DESCRIPTION OF THE DRAWINGS

FIG. 12b is a table for the pulse catch circuit enable register;

FIG. 12c is a table for the pulse catch circuit reserved registers;

FIG. 12d is a table for the pulse catch circuit input point status register;

FIG. 16 is a software code listing;

FIG. 17 is a state diagram of the pulse output block;

FIG. 18 is a software code listing;

FIG. 19 is a table for high speed operations;

FIG. 20 is a block diagram of the I/O expansion slot.

FIG. 21 is a table for the I/O expansion slot;

FIG. 23 is a table of components;

FIG. 24 is a table of levels;

FIG. 27 is a table of parity bits;

FIG. 28 is a table of CPU types;

FIG. 29 is a table of interrupts;

FIGS. 30b, c and d are tables of SM bit definitions

FIG. 30e is a table of port definitions;

FIG. 32a is a table of control functions;

FIG. 33a is a table of control functions;

FIG. 34d is a table of boolean expressions;

DETAILED DESCRIPTION OF THE PREFERRED EMBODIMENTS

General Description Of The Programmable Logic Controller (PLC)

Figure 1:
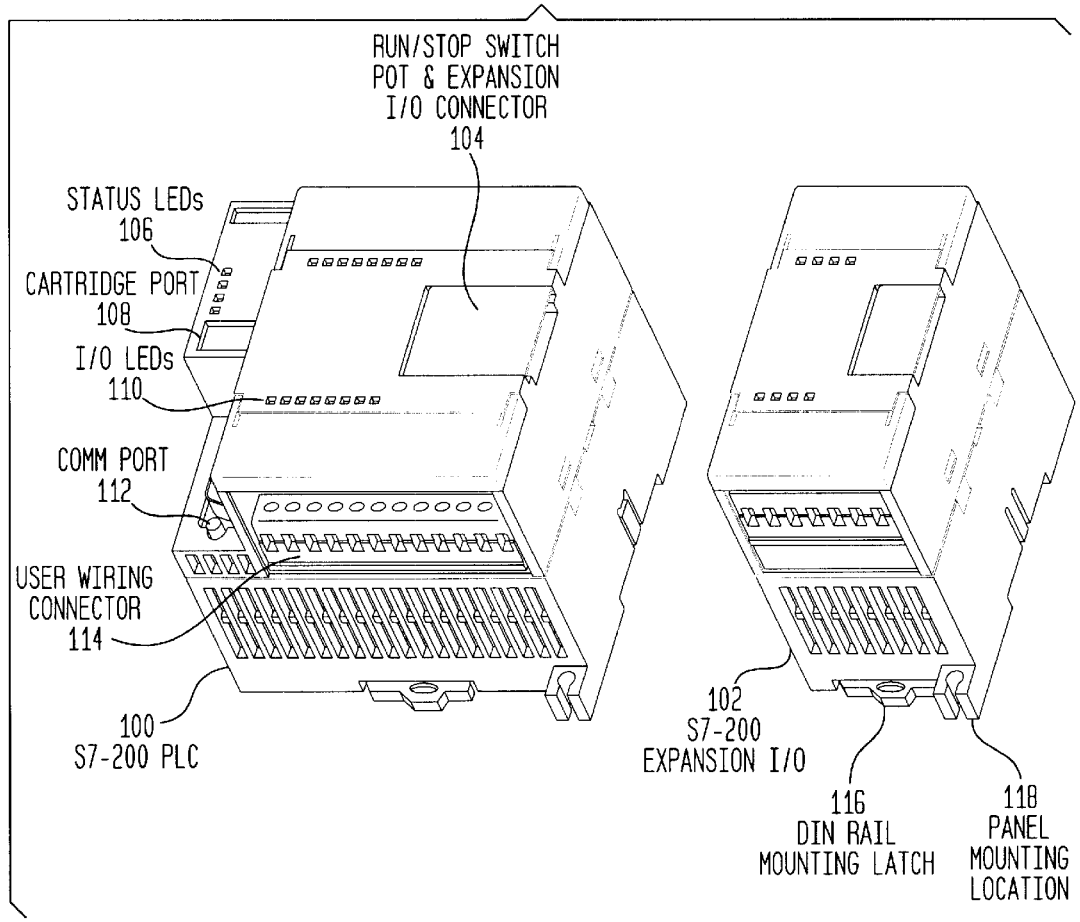
FIG. 1 is a perspective view of the PLC of the present invention.

The exemplary Programmable Logic Controller (PLC) 100 of the present invention is shown in FIG. 1.

The figure illustrates the input/output (I/O) capabilities of the PLC 100. The user controls the PLC 100 by operation of the run/stop switch potentiometer and expansion I/O connector 104. Status light emitting diodes (LED's) 106 indicate the status of the PLC 100. A cartridge port 108 is provided for receiving a cartridge for expanding the function of the PLC 100 including, for example, increasing the memory. I/O LED's 110 are provided for indicating the status of the input/output pins of the PLC 100. A communications port 112 couples the PLC 100 to external components including, for example, other PLCs. The communications port may be used to connect the PLC 100 to other PLCs in a master slave relationship. The communications port 112 may also be used to connect to, for example, to a computer (such as a network computer or a personal computer). The PLC 100 may also connect to the internet through the communications port 112 via a modem or equivalent communications protocol device. User wiring connector 114 allows the user to connect external the PLC 100 to devices, such as motors and other peripheral devices.

In the figure, the PLC 100 is shown adjacent an expansion I/O that expands the input/output capabilities of the PLC 100. The expansion module, as well as the PLC 100, includes DIN rail mounting latch(es) 116 and a panel mounting location 118 for affixing the PLC 100 and the expansion I/O 102 to a suitable mounting fixture.

It will be appreciated that the PLC 100 of the present invention may include multiple arrangements and configurations of PLCs, several expansion I/O modules, and accessories that include memory cartridges, clock cartridges, battery cartridges cables or I/O simulator switch assemblies. This invention will address a fraction of the possible configurations relevant to the particulars of the various aspects described herein and the practitioner will instantly recognize these configurations with an understanding of the herein-described invention. The PLC of the present invention is classified as a Micro PLC because of its small physical size. While the PLC is physically small in size, it includes many features that make it as powerful as (if not more powerful than) physically larger PLCs. FIG. 1 shows a drawing of the PLC and an I/O module with possible dimensions. The design of the PLC 100 is described with reference to FIGS. 39a and b.

Figure 2:
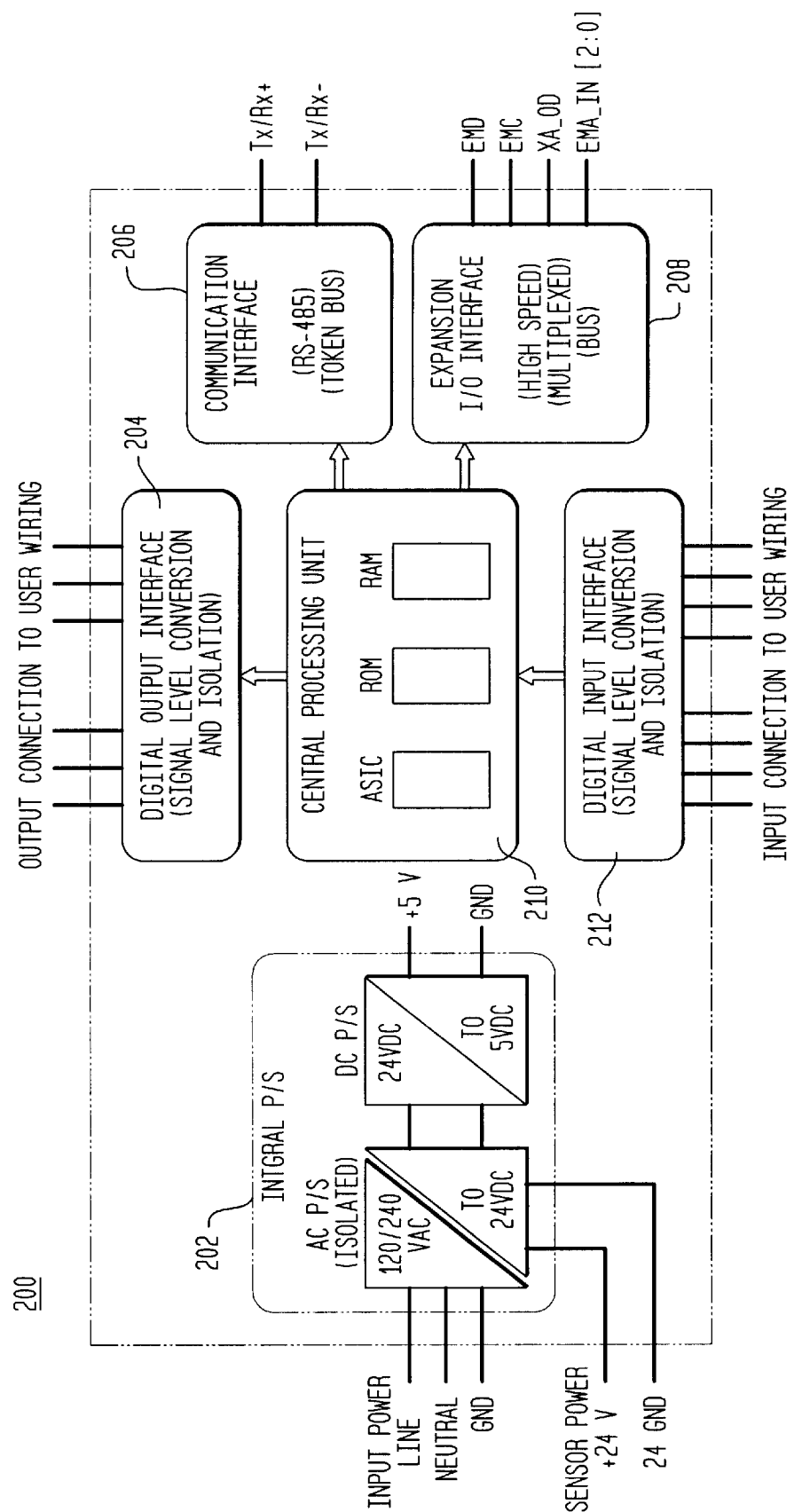
FIG. 2 is a block diagram of the PLC.

FIG. 2 shows a block diagram 200 of the PLC of the present invention. The block diagram shown is for a PLC with an integral AC power supply 202 for providing power. A central processing unit 210 is the core of the PLC 200 (100) and includes an ASIC, ROM and RAM. A digital input interface 212 is provided for inputing signals from the user wiring 114 (FIG. 1). A digital output interface 204 couples the PLC 200 to the user wiring 114 (FIG. 1). A communications interface 206 couples the PLC 100 to external devices via, for example, an RS-485 or token bus communication. An expansion I/O interface 208 connects the PLC 200 to expansion I/O interface(s) via, for example, a high speed, multiplexed bus.

In operation, the AC power supply 202 may provide an isolation boundary between the AC line and outputs, such as the 24 VDC and 5 VDC outputs. The PLC may be offered with a 24 VDC power supply as well. The 24 VDC power supply models would not provide isolation from 24 VDC to 5 VDC. The digital input interface 212 optically isolates the user wiring from the Central Processing Unit (CPU) 210 which includes all the logic level signals. The digital output interface provides a similar isolation boundary between the user wiring and the CPU. This isolation boundary is provided in the form of optical isolation or through relays where the relay coil is isolated from the relay contact. No isolation is shown in the figure between the CPU and the communication interface or the expansion I/O interface, but may be provided. All expansion I/O modules provide an optical isolation boundary between user wiring and the 5 VDC logic signals. The CPU 210 is comprised of the ASIC which includes the microprocessor, RAM and ROM. The ROM contains the operating system for the PLC 200 and may be either EPROM or FLASH EPROM depending upon the PLC model. The RAM is used for operating system data storage and scratch pad as well as for storing the user program that has been compiled into executable code.

Figure 3:
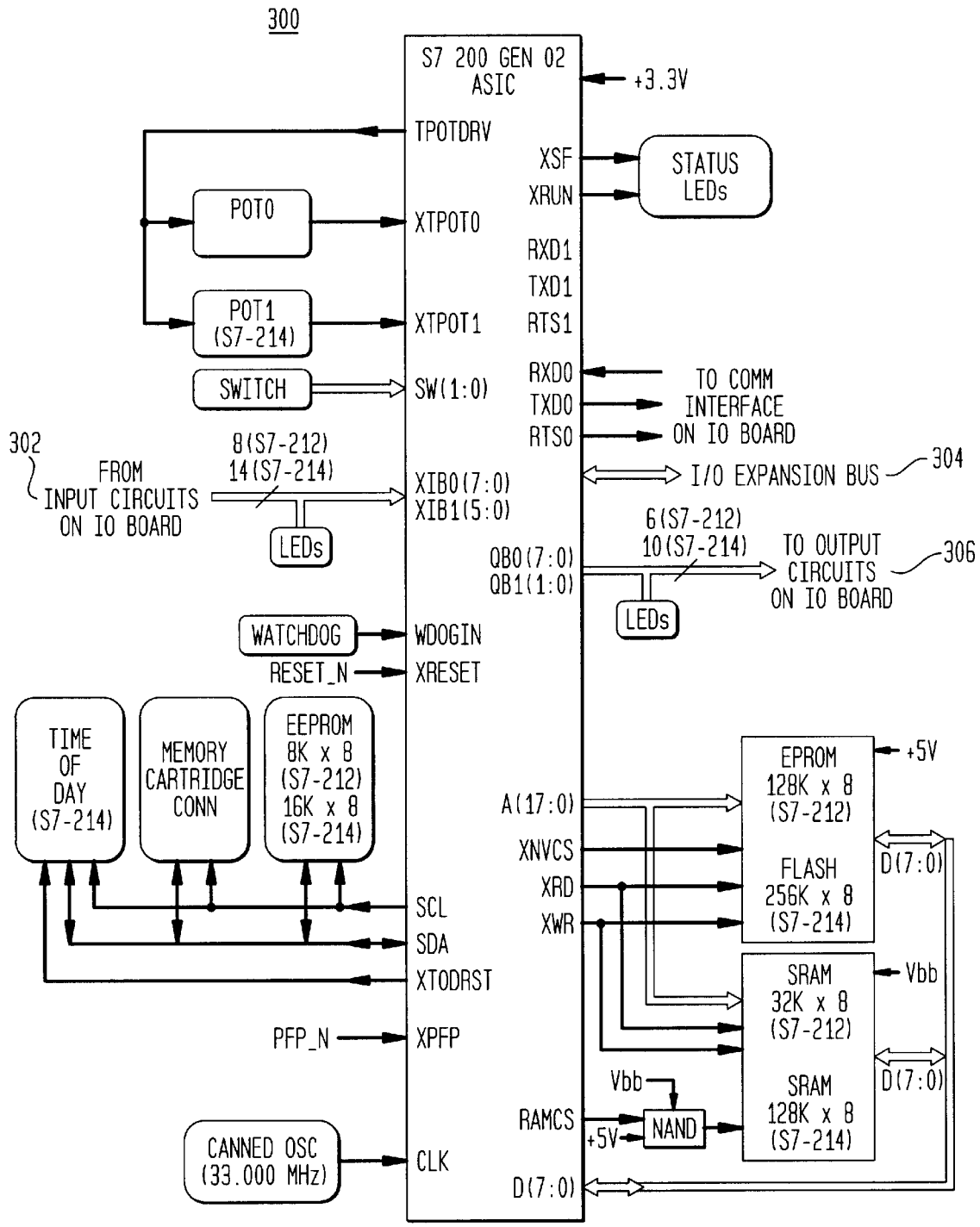
FIG. 3 is a schematic diagram of the PLC.

A block diagram of the Central Processing Unit (CPU) 300 H/W is shown in FIG. 3. The connections of the CPU shown are not described in detail herein.

The particular connections of interest here are the input circuits on I/O board 302, the I/O expansion bus 304 and the output circuit on I/O board 306 connections. In any event, FIG. 3 illustrates these details in sufficient schematic clarity that the practitioner will have no problem understanding the details from a review of the figure. It shall be appreciated that FIG. 3 illustrates only one arrangement and that those skilled in the art will readily understand how to implement other, equivalent, arrangements particularly in view of the instant specification.

Figure 4:
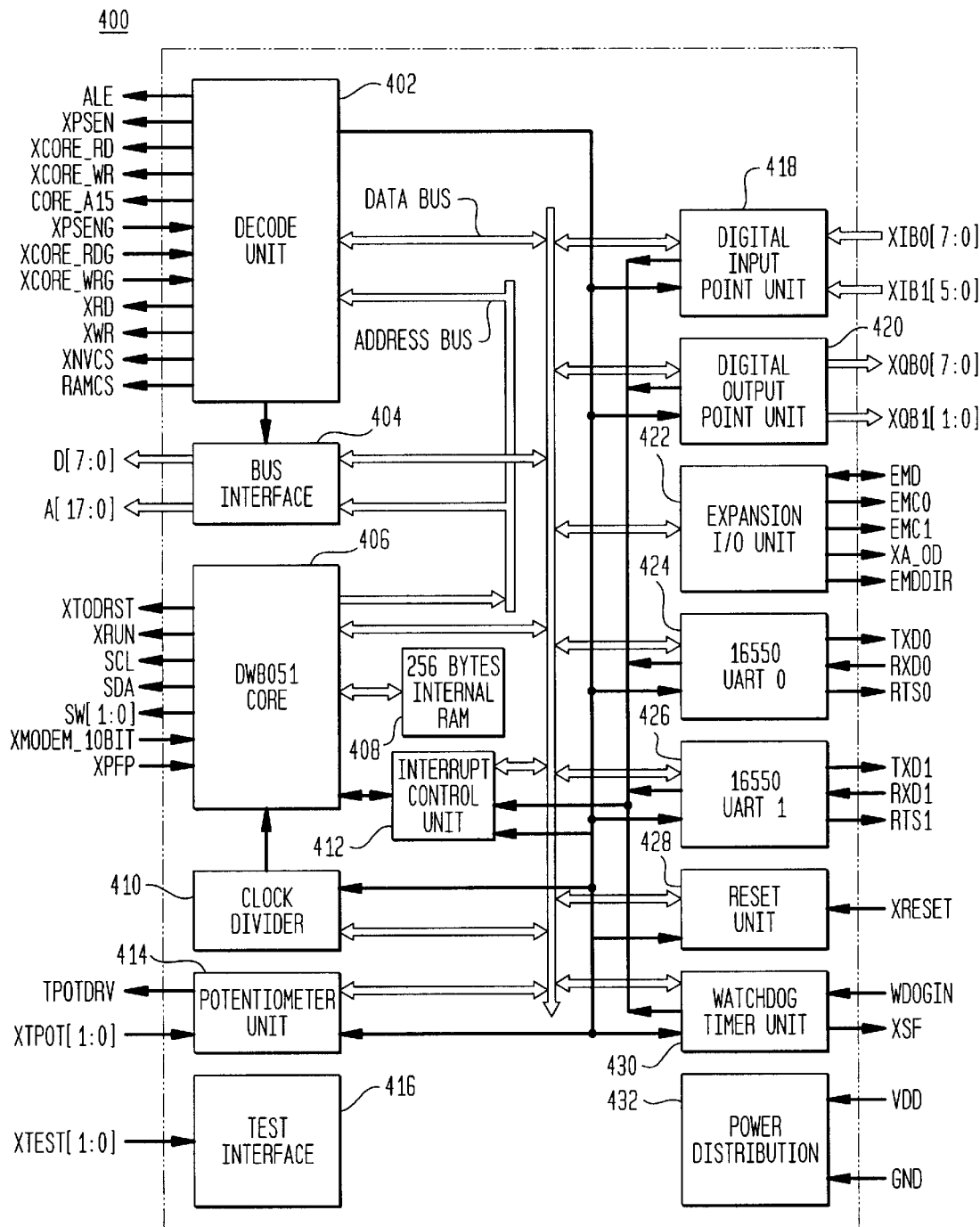
FIG. 4 is a block diagram of the ASIC.

The CPU 300 and connections are arranged as an ASIC shown in diagrammatic form in FIG. 4. As shown, the ASIC includes a microprocessor 406 (labeled "core"), address decode unit 402 and mapping logic. Two UARTs (Universal Asynchronous Receiver Transmitter) 424, 426 are provided that effect the electronic circuit that makes up the serial port. UARTs convert parallel bytes from the CPU into serial bits for transmission, and vice versa. However, other communication arrangements are possible. There are digital input conditioning circuits 418, high speed counters 410, pulse train output circuitry 420, potentiometer circuitry 414, watchdog circuitry 430 and reset circuitry 428. A bus interface 404 is provided. The expansion I/O unit is labeled 422. A test interface is provided for testing the PLC 100. The power distribution circuit is illustrated as circuit 432. The memory is shown as internal RAM 408. An interrupt control unit 412 handles interrupts for the CPU 406.

The PLC 100 provides a means for users to create specific application control programs that, when executed by the PLC, direct the operation of machines and/or processes used in the manufacturing of a wide variety of products. In this way the PLCs are similar to all other PLCs and the practitioner will immediately understand the more mundane aspects of the invention with such basic understanding of PLCs. In spite of the similarity in use and function of the PLCs there are many unique features and functions that are blended into the PLC 100 of the present invention which expand and enhance its utility to the user as will herein be described.

Digital Input Point Unit

The digital input point unit 418 will be described. After each of the digital input signals (I0.0 to I1.5) has been converted to a compatible signal, e.g., +5V signal, and isolated from the user wiring, it is fed into the Digital Input Point Unit 418 of the ASIC. A block diagram for input points IB0[2:0] which illustrates the functionality provided by the Digital Input Point Unit 500 (418, FIG. 4) is shown in FIG. 5.

This unit 500 performs a number of functions on the digital input points connected from the user's application to the CPU. This unit filters the input points and provides access to the filtered state of these points. A pulse catch functionality is provided on each input point to optionally allow the capture of short duration pulses. An edge interrupt function is provided to generate interrupts on the occurrence of rising and falling edge transitions on certain input points. High-speed counters are used to count events that occur too fast for the CPU scan rate.

Figure 5:
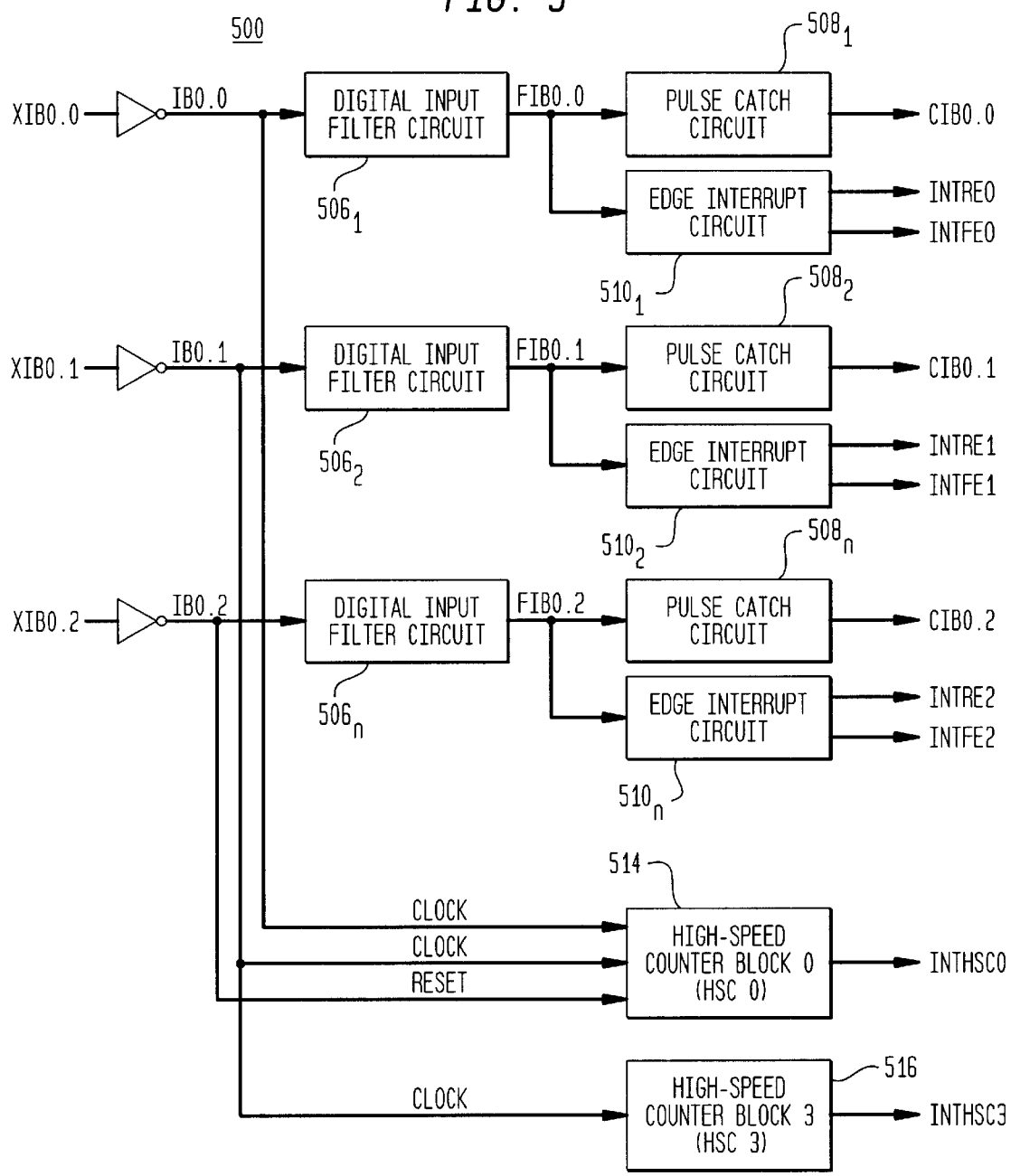
FIG. 5 is a block diagram of the input block.

As shown in FIG. 5, a digital input filter(s) $506_{1-n}$ provides a software configurable filter. That is, the PLC sets the filter parameters that control the filtering function in accordance with software executed by the PLC. In at least one arrangement, up to 8 filter values are configurable by software, from 0.2 msec to 12.8 msec, for example. Filter implementation is possible with, for example, a 4-bit up/down counter on each input point. A pulse catch circuit(s) $508_{1-n}$ allows for the capture of a rising or falling edge transition of the filtered input until software has a chance to read the value. Independent enable/disable of the pulse catch function is provided for each input point. An edge interrupt circuit(s) $510_{1-n}$, when this function is enabled, generates an interrupt upon the occurrence of a rising edge and/or falling edge transition on, for example, up to four input points. High-speed counter(s) 514 (516), in this case six high-speed counters (HSC) are supported, each contain, for example, a 32-bit up/down counter and a 32-bit compare register. The 32-bit register captures the counter value so that it can be read by software. Each counter and compare register are loadable by software. Four of the HSC's, for example, can handle two-phase clocking. The other two HSC's may support single-phase clocking only. Each HSC can generate interrupts upon the occurrence on equality of the counter vs compare register, upon a direction change condition, and upon the assertion of the HSC's external reset input.

Digital Input Filter Circuit

The implementation of the input filters in previous ASIC circuitry consumes too many gates. In the ASIC of the present invention, there is a need to provide compatible functionality without consuming so many gates. The following is a description with reference to FIGS. 6a to 6d and 7 that implements input filters with considerably less logic in the instant ASIC by employing the truth table of FIG. 6b.

Figures 6A, 6B:
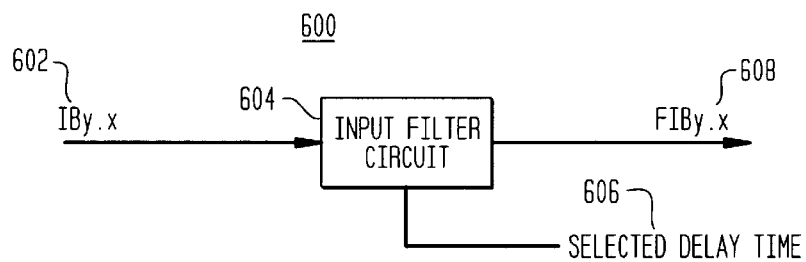
FIG. 6a is a block diagram of the input filter circuit.
FIG. 6b is a truth table of the input filter circuit.

The ASIC provides digital input filtering for, for example, fourteen digital input points as shown in FIG. 6a and 6b. In FIG. 6a, the digital input filter circuit 600 (506, FIG. 5) includes input 602, input filter circuit 604, selected delay time 606 and output 608. The filter delay times set by the selected delay time 606 are software configurable to, for example, one of seven different values. The filter delay times are selected through settable registers internal to the ASIC. The following table in FIG. 7 describes the possible relationship between the value written to the register and the corresponding delay time selected. Of course, other relationships are possible.

Each digital input filter simulates the action of a capacitor being driven by a constant current source whose output voltage is sensed by a comparator with a large amount of hysteresis. The digital equivalence of this analog circuit is implemented as a four bit, up/down counter whose counting direction is controlled by the state of the input point. The frequency at which the counter is clocked is determined from the selection values written into registers internal to the ASIC by software. The 1 MHz Master Clock is used as the time base for each filter so that its operation is independent of the system clock frequency. The delay time is calculated from the following formula:

digital filter delay time=12*(period of the up/down counter's selected input clock)

Figures 6C, 6D:
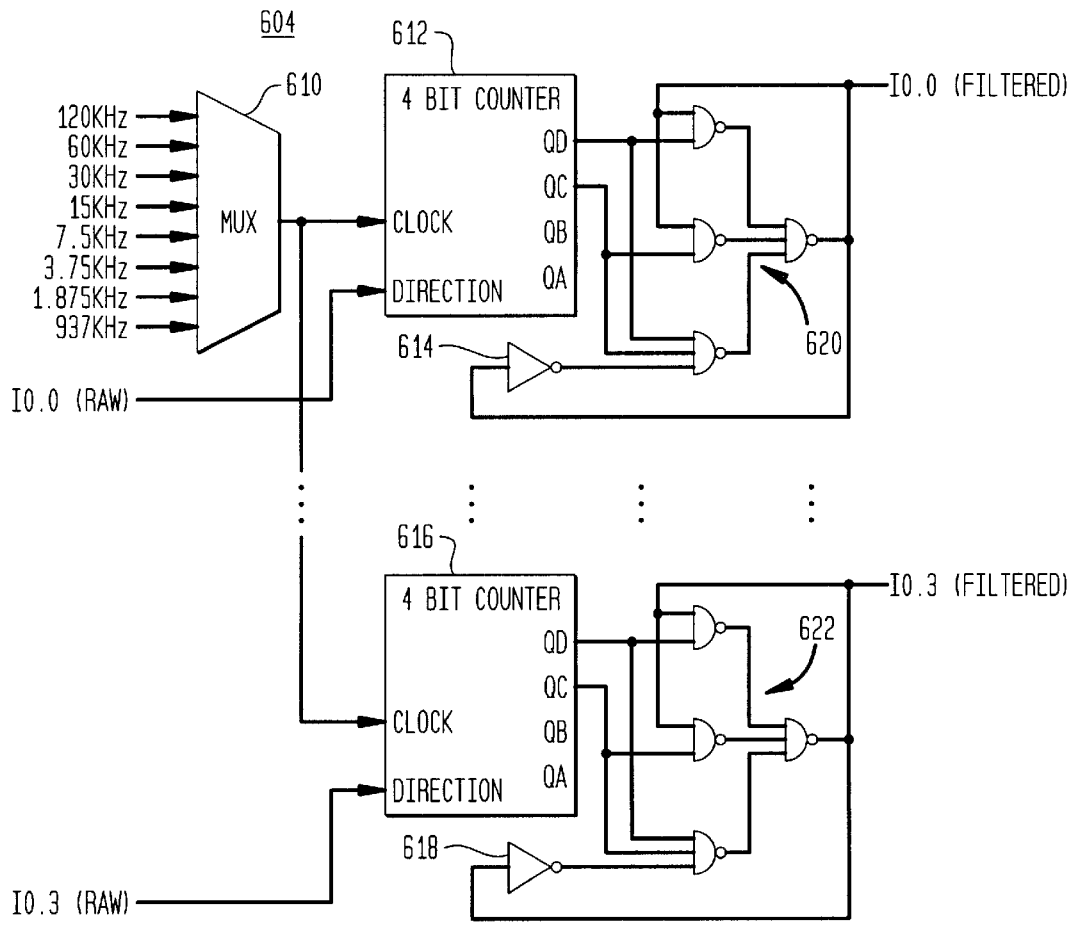
FIGS. 6c and d are block diagrams of the input filter circuit.

The truth table in FIG. 6b defines the operation of the digital equivalent circuit where the result produced by the filter is the output value 608 (FIBy.x). One skilled in the art will immediately appreciate that the details of the circuitry may be implemented from the table in FIG. 6b using well-known boolean logic. The exemplary circuit is shown in FIG. 6c.

For each group of, for example, four inputs a multiplexer 610 outputs one of eight clocks which is used to set the input filter delay time. The clock selected by the multiplexer 610 drives a four bit up/down counter 612 (one for each of the inputs in each group of four inputs). The physical input controls the direction (up/down) of the four bit counter. When the input is ON (logical '1') the counter counts up. When the input is OFF (logical '0') the counter counts down. The count up sequence of the counter is:

0, 1, 2, . . . 13, 14, 15, 15, 15, . . . 15

The count down sequence of the counter is:

15, 14, 13, . . . 2, 1, 0, 0, 0, . . . 0

As indicated by the counting sequence, the counter will not roll over when counting up or when counting down. The filter delay 614 is designed to mimic the operation of a constant current source driving a capacitor whose voltage is sensed by a comparator with a large amount of hysteresis. In this case, in order to detect an input transition from off to on, the counter must reach a count of 12. Once this count is reached, the output will be turned on and it will remain on until the threshold for an input transition from on to off is reached at a count of 3. The nand gate logic 620 shown in the figure implements these thresholds.

The thresholds are semetric in that 12 up counts or 12 down counts are required from a steady state low or high input condition. The table in FIG. 6d lists the delay times for 12 clocks at each of the frequencies supplied to the multiplexer. Of course, other delay times are possible. Additional layers, each layer to including a counter 616, nand gate logic 622 and a delay 618 may be provided for each input that operate in a corresponding manner as the afore-described layer.

Pulse Catch Circuit

Figures 7, 8:
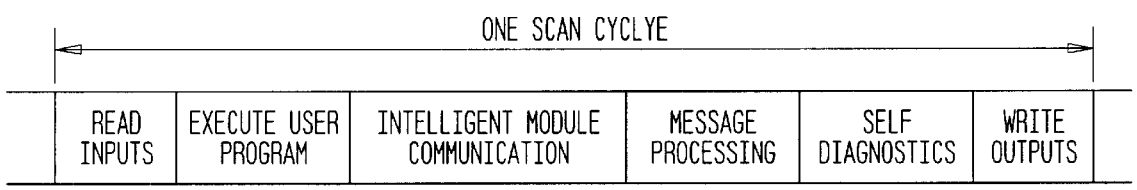
FIG. 7 is a table of delay times.
FIG. 8 is a timing diagram of the scan cycle.

Following the digital input filter circuit is a pulse catch circuit (508, FIG. 5). The purpose of this circuit is to capture either a change in the input state from high to low or from low to high and hold it until the PLC operating system software has recognized the change in state. The PLC reads the state of the inputs in a cyclic fashion in both STOP and RUN modes. (The main difference between STOP and RUN modes in the PLC is that in STOP mode the user's program is not executed whereas in RUN mode the user's program is executed.) FIG. 8 shows the PLC scan cycle (the cycle is normally called the PLC scan cycle or simple scan.) As shown in FIG. 8, the PLC scan cycle in RUN mode reads the input once per cycle. The same scan cycle is followed in STOP mode, but the user program is not executed in STOP mode.

Since inputs are only read once per cycle, it is possible for inputs to change state without the PLC ever recognizing the change. Such state changes that occur too fast for the PLC to recognize are referred to as pulses. In order to prevent the PLC from missing a short pulse on an input, the user can enable an input interrupt which will suspend normal program execution while the PLC services the interrupt. This method is very effective, but it requires additional support from the CPU and uses up considerable execution time to process the interrupt routine. For this reason only a small number of input interrupts are allowed.

The other method is to provide pulse catch circuits on each of the integral inputs to the PLC. This method allows infrequent but short duration pulses (either high going or low going) to be captured and held until the PLC recognizes the change at the appropriate point in the scan cycle.

Pulse Catch Circuit Top-Level Block Diagram

Figure 9:
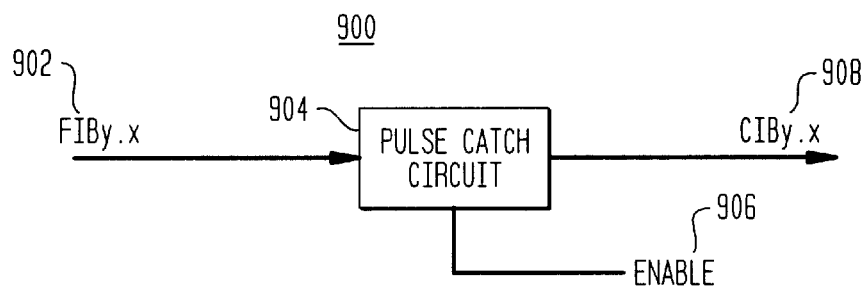
FIG. 9 is a block diagram of the pulse catch circuit.
Figure 10:
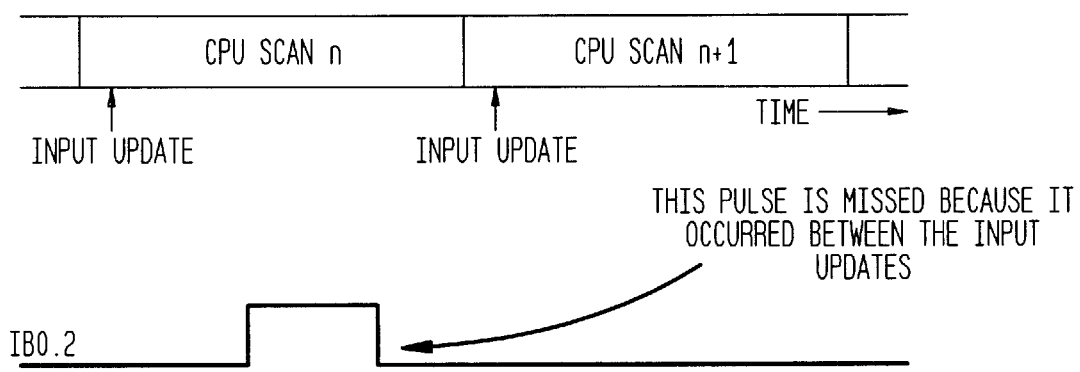
FIG. 10 is a timing diagram of the scan cycle.

Now in more detail, FIG. 9 illustrates the pulse catch circuit 900 (508, FIG. 5) wherein input 902 are coupled to pulse catch circuit 904, are captured according to the enable signal 906, and output 908. In this manner, the pulse capture circuit is able to capture and hold digital input point pulses whose duration is greater than the selected filter time but is less than the scan time. FIG. 10 illustrates the problem where the pulse is missed because the pulse occurred between the input updates.

The CPU software is designed to read the state of all input points once per CPU scan and this operation is called the input update. As mentioned above, a pulse can be missed if it occurs between the input updates of consecutive CPU scans (see the example in FIG. 10). The pulse catch circuit 904 captures and holds this type of event. In one possible arrangement, there are fourteen pulse catch circuits, one for each input point.

When a pulse catch circuit is enabled, a change in state (low→high or high→low) of an input is captured. Further state changes of the input are ignored until the captured value has been read by the software during the next CPU scan. Once the captured value has been read, the circuit is then able to detect new input state changes.

Figures 11, 12A:
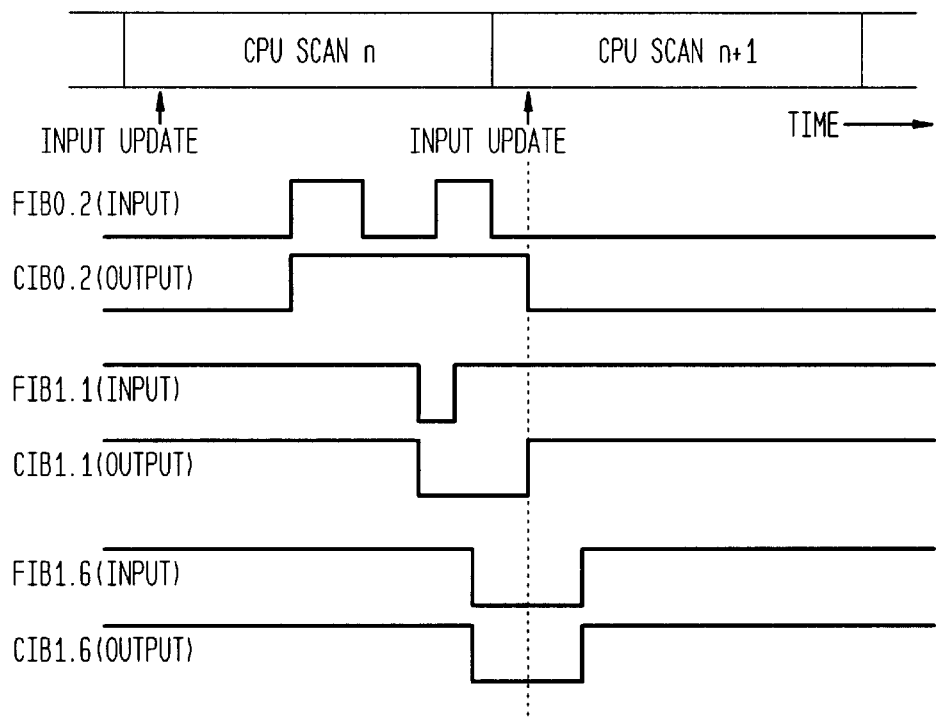
FIG. 11 is a timing diagram of the scan cycle.
FIG. 12a is a truth table for the pulse catch circuit.

The operation of the pulse catch circuit can be described more precisely with the truth table for a synchronous state machine shown in FIG. 12a. The symbols used in this table are defined below:
PCE—Pulse catch circuit enable bit
I—Input signal synchronized to the system clock by the input filter circuit (FIBy.x)
CV—The input value captured after state change of the input and after an input update
  (synchronized to the system clock)
F—State change flag (synchronized to the system clock)
RP—Read pulse (one for each input status byte) generated by a read of the input status byte
  (synchronized to the system clock in such a way that it is active for one clock cycle and goes inactive on the clock edge that transferred the status of the input)
PS—Present State
NS—Next State In operation, and with reference to FIG. 12a, when the circuit detects a change of state on the input, the new value of the input is captured and a state change flag is set. While the state change flag is set, the stored input value is held and cannot be updated. Therefore, any input changes occurring while the state change flag is set are ignored. After the stored value is read by software, the state change flag is reset, the current state of the input is captured, and the detection of input state changes is re-enabled. This sequence of actions is called re-triggering the pulse catch circuit. The result is that the input pulse is captured even though the update occurs between scan cycles as shown in FIG. 11. See, for example, CIB1.6 that shows that the pulse catch circuit output 908 captures the input pulse 902 even though the pulse occurs between scans, i.e., scan n and scan n+1.

Two 8-bit registers, for example, are provided in this block for individually enabling and disabling the pulse catch function on each of the sixteen input points. These enable registers are defined in the table shown in FIG. 12b. Input status registers are provided to give the CPU software access to the conditioned input point states, CIB0[7:0] and CIB1 [5:0], which are output from the pulse catch circuitry. These are shown in FIG. 12c. The format of the input status registers is shown in FIG. 12d.

The circuit elements of the pulse catch circuit, as will be appreciated by those skilled in the art, will be readily recognizable from the truth table shown in FIG. 12a. It will further be appreciated that the pulse catch circuit, therefore, may have a plurality of configurations that fulfill the truth table.

Figure 12E:
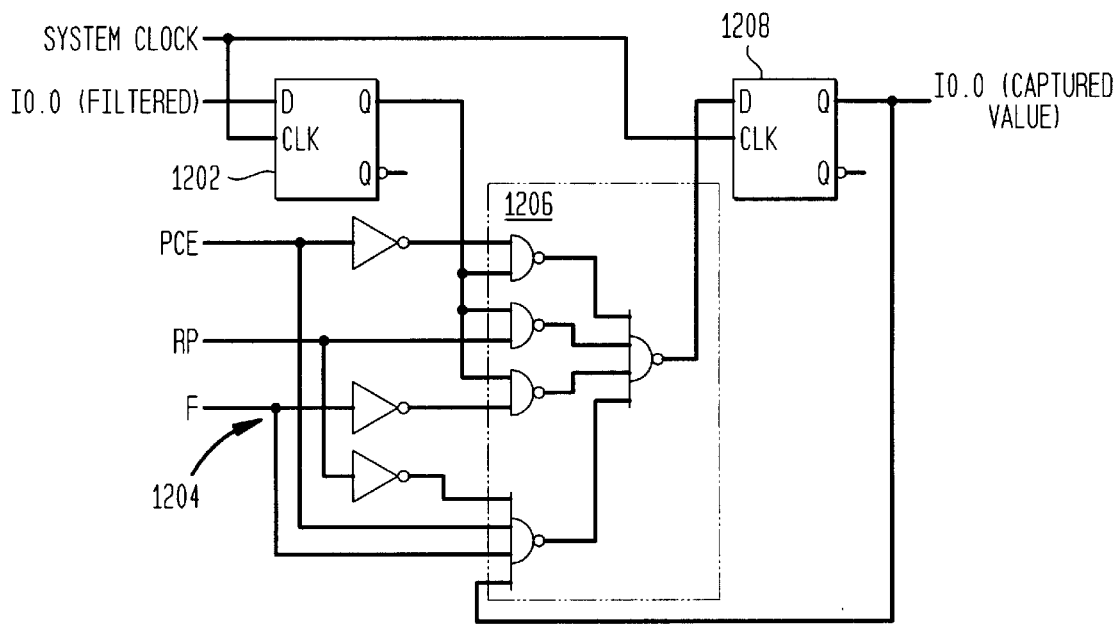
FIG. 12e is a block diagram for the pulse catch circuit.
Figure 12F:
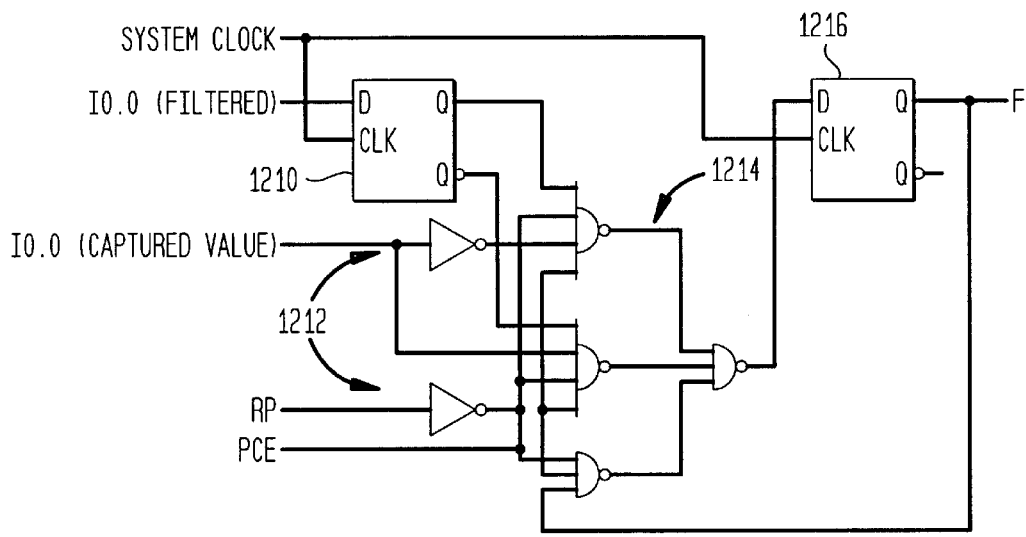
FIG. 12f is a block diagram for the pulse catch circuit.

The exemplary pulse catch circuit that operates in accordance with the foregoing description is shown in FIGS. 12e and 12f. A system clock pulse drives flip-flops 1202, 1208. The input signal is coupled to the first flip flop 1202, the Q output of which is coupled to the nand gate logic 1206. Signals PCE, RP and F are delayed and coupled to corresponding nand gates in the nand gate logic 1206, as shown. In addition, the output of the second flip flop 1208 is fed back to the nand gate logic 1206. The output of the nand gate logic is coupled to the second flip flop 1208 and, upon being latched thereby, is clocked to the output. The F signal is generated in FIG. 12f, wherein the system clock drives flip flops 1210 and 1216. The first flip flop latches the input and the second flip flop latches the output of the nand gate logic 1214. The nand gate logic 1214 is arranged as shown to implement the afore-described logic on the signals output from the first flip flop (Q), the inverted version of Q, the captured version of the input signal and its delayed version (delayed by the delays 1212), the RP signal delayed by delays 1212 and the PCE signal.

The pulse catch circuits can be individually enabled and disabled. If a pulse catch circuit is disabled, then the circuit input is passed through to the circuit output. If enabled, then the pulse catch functions described above are active.

Digital Output Point Unit

This digital output unit (420, FIG. 4) allows direct software control of the state of each output point. In addition, a pulse output capability allows pulse train output and pulse width modulated output on up to two of the output points.

Figure 13:
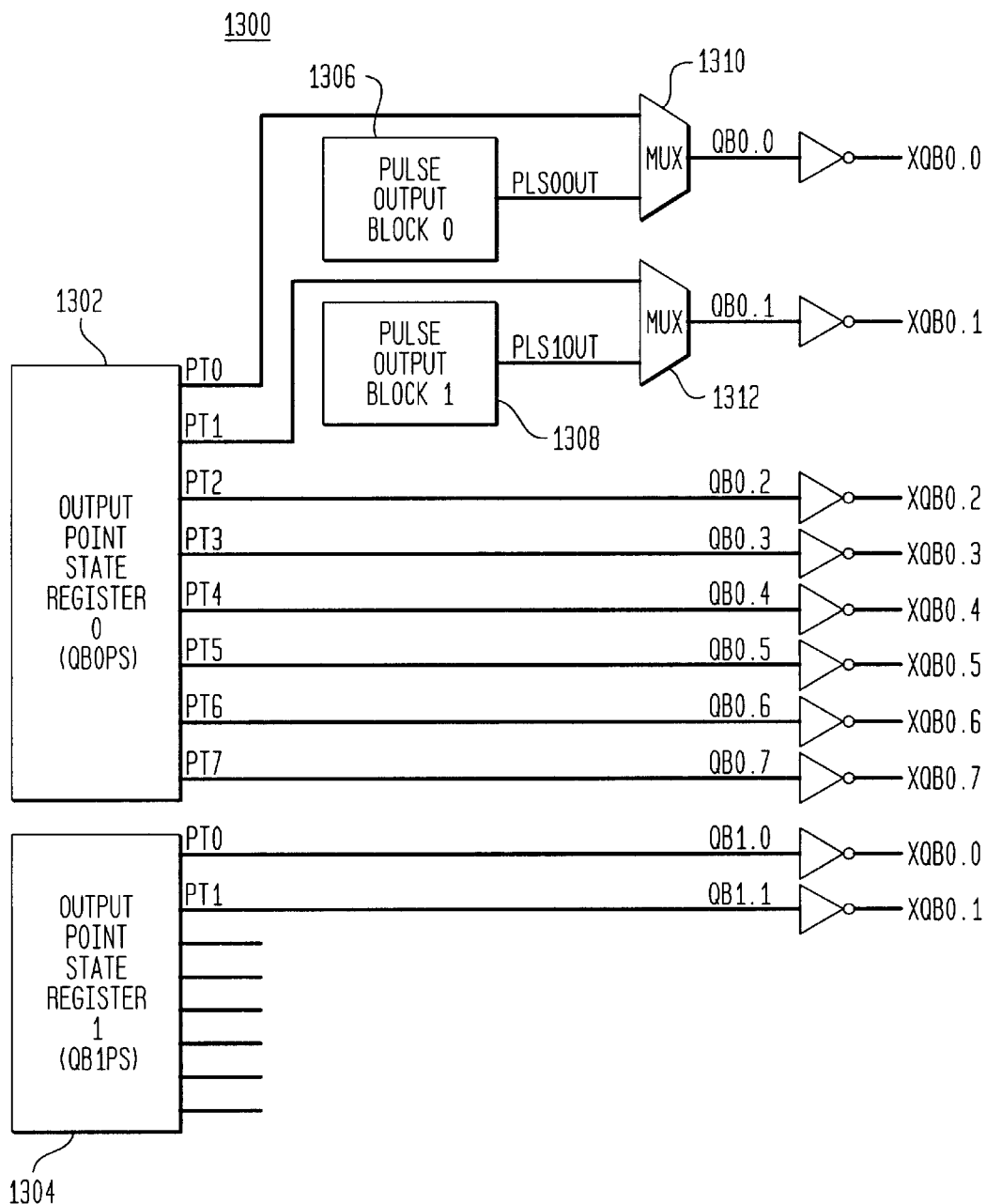
FIG. 13 is a block diagram of the output block.

Now with reference to FIG. 13, the ASIC provides two output point state registers 1302, 1304 for software control of the state of ten digital output points. In addition, two Pulse Output Blocks 1306, 1308 (PLSs) may be implemented to provide the capability of generating pulsed wave-forms at a frequency faster than software can accomplish.

Within the pulse output blocks 1306, 1308, the ASIC provides a choice of two output functions, e.g., PWM (pulse width modulated) or PTO (pulse train output). The PWM function provides for continuous pulse output with a programmable cycle time and duty cycle. Intended mainly for stepper motor applications, the PTO function provides for the output of a specified number of approximately 50% duty cycle pulses. Of course, other applications will be appreciated by those skilled in the art. The cycle time in the PTO function is also programmable and can either be fixed or can be automatically adjusted to increase or decrease at a user-specified rate.

When PLS0 is operating (enabled), it has control of output point XQB0.0 via MUX 1310. Otherwise, XQB0.0 is controlled by the value which software writes to the output point state register of the ASIC. Likewise, PLS1 controls the state of XQB0.1 if enabled, via MUX 1312, and the output point state register of the ASIC controls the state of XQB0.1 if PLS1 is not enabled.

Pulse Output Blocks

The ASIC shown supports two pulse output (PLS) blocks. Of course, any number of PLSs are configurable. These blocks allow the CPU to produce waveforms at frequencies faster than the CPU software is capable of manually generating. The output from Pulse Output Block 0 (PLS0) is one of the sources of output point XQB0.0 and the output from Pulse Output Block 1 (PLS1) is one of the sources of output point XQB0.1.

The ASIC for the PLCs provided both the Pulse Train Output (PTO) and the Pulse Width Modulated (PWM) functions. PTO is an operational mode in which the period (cycle time) of the wave-form and the number of cycles (pulse count) is specified by software. The duty cycle of the wave-form is approximately 50%. PWM is an operational mode in which the period (cycle time) and duty cycle (pulse width) are specified by software and the wave-form is output continuously.

It was discovered that there was a fundamental problem with the implementation of these functions in that there was no way to smoothly transition from one PTO or PWM wave-form to another. Each transition required that the pulse output block be stopped by the software and then restarted which introduced a discontinuity in the resultant output wave-form.

Because of the problem with transitions from one wave-form to another as described above, the ASIC of the present invention provides the pulse output block with a hardware pipeline mechanism to allow for smooth, hardware-controlled transitions from wave-form to wave-form. Also, to allow for better operation with stepper motors, the ability to automatically ramp the value of the cycle time at a specified rate was added to the ASIC.

PLS Block Diagram and Operational Overview

Figure 14A:
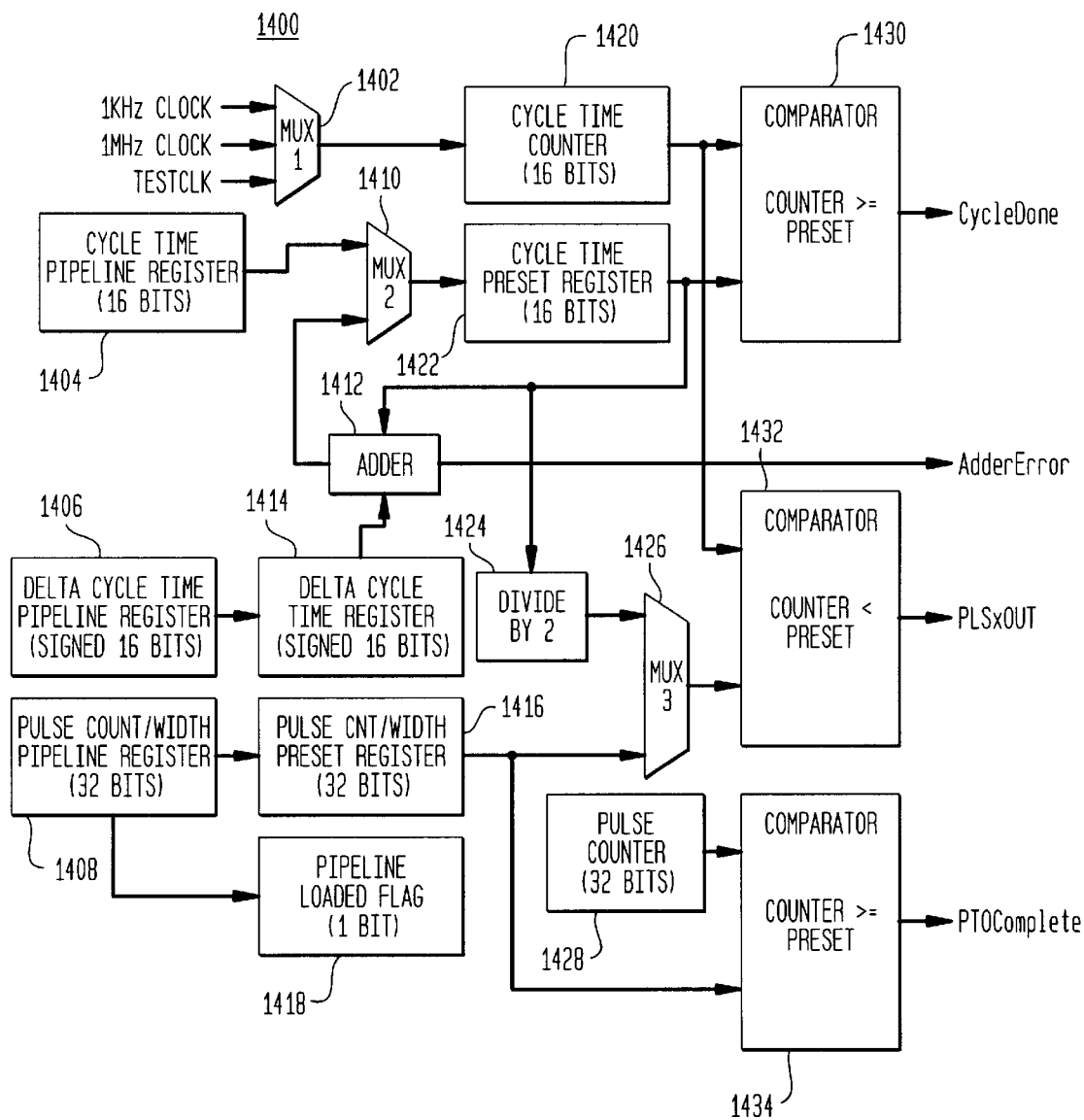
FIG. 14a is a block diagram of the pulse output block.

The block diagram in FIG. 14a shows the organization and components of each pulse output block 1400.

PLS Time Base Generation—The time base (e.g., 1 ms or 1 μsec) is provided by a multiplexer 1402 that selects either, for example, the 1 MHz Master Time Base clock or a 1 KHz clock derived from the Master Time Base clock.

Wave-form Period Control—The output of the time base multiplexer drives a 16-bit up counter, called the cycle time counter 1420. This counter is incremented on the rising edge of the time base clock. The output of this counter is compared by comparator 1430 with the value stored in a 16-bit cycle time preset register 1422 to control the period of the output wave-form. When the value of the cycle time counter reaches the value of the cycle time preset register, then the current cycle is complete and the CycleDone event is generated.

The values stored in the cycle time counter 1420 and cycle time preset register 1422 are unsigned values. The valid range of the cycle time counter 1420 is, for example, 0 to 65535. The valid range of the cycle time preset register is 2 to 65535. The comparison to determine CycleDone is an unsigned comparison.

A delta cycle time register 1406 exists for use in PTO mode to hold a signed, twos-complement 16-bit value that is added to the value stored in the cycle time preset register 1422 at each CycleDone event. If the sum exceeds 65535 or is less than 2, then the AdderError event is generated. For example,

| preset = 65530 | (FFFAH unsigned) | | preset = 65530 | (FFFAH unsigned) |
|---|---|---|---|---|
| delta = –20 | (FFECH signed) | | delta = 20 | (0014H signed) |
| sum = 65530+(–20) = 65510 | | OK | sum = 65530+(20) = 65550 | Adder Error !!! |
| preset = 100 | (0064H unsigned) | | preset = 100 | (0064H unsigned) |
| delta = –20 | (FFECH signed) | | delta = –120 | (FF88H signed) |
| sum = 100+(–20) = 80 | | OK | sum = 100+(–120) = –20 | AdderError !!! |

In PWM mode, the delta cycle time register is held at a value of 0.

Software may load the cycle time preset register 1422 and the delta cycle time register 1406 only when the PLS block is disabled. The valid range of this register in PTO mode is, for example, –32768 to +32767.

Wave-form Duty Cycle Control—The output of the cycle time counter 1420 is also used in the control of the wave-form's duty cycle. There is an unsigned comparison performed between this counter value and a pulse width preset value whose source is determined by the PLS operating mode. The state of the PLS block output signal PLSxOUT is determined by this comparison. While the counter value is less than the pulse width preset value, the PLSxOUT signal is high. When the counter value reaches or exceeds the preset, then the PLSxOUT signal is driven low. The pulse width preset value is obtained from the lower 16-bits of the pulse count/width preset register 1408, if in PWM mode, or is one-half the value stored in the cycle time preset register 1422, if in PTO mode.

If the pulse width preset value is 0, then PLSxOUT will be low for the entire cycle. If the pulse width preset value is equal or greater than the cycle time preset, then PLSxOUT will be high for the entire cycle.

The pulse count/width preset register 1408 is loaded by software but only the lower 16-bits are significant when operating in PWM mode. Therefore, software should only write the least significant word of the register in PWM mode. The valid range of this register in this mode is 0 to 65535. This register may be loaded by software only when the PLS block is disabled.

Cycle Quantity Control (PTO mode only)—A 32-bit up counter, called the pulse counter 1428, is driven on each CycleDone event to count the number of cycles generated on the PLSxOUT signal. The value stored in this counter is compared by comparator 1434 to the value in the 32-bit pulse count preset register 1416 to determine completion of the current PTO operation. When the pulse counter 1428 value reaches the pulse count preset value, the PTOComplete event is generated. In PWM mode, this counter is not used.

In PTO mode, the full 32-bits of the pulse count/width preset register 1416 is significant and is loaded by software.

The valid range of this register in this mode is 1 to ($2^{32}-1$). This register may be loaded by software only when the PLS block is disabled.

Operational Control—A control register contains bits to allow the software to enable or disable the operation of the PLS block. Once software enables the PLS block, the switch-over of the output point from QB×PS control to PLS block control as well as the operation of internal counters and comparisons is synchronized with the next rising edge of the time base clock. This is done to ensure that the initial cycle of the output wave-form is of proper duration and pulse width. This register is held at its reset state in the case of watch dog time out fault condition or due to direct software control of the output disable function.

A setup register contains bits to allow the software to configure the operation of the PLS block. Included are a PLS time base select and an operating mode select. An interrupt enable register gives the software the ability to individually enable and disable interrupt generation for the PTOComplete and AdderError interrupt events. A status register is provided to allow the software to obtain information about the current operational state of the PLS block. This information includes the enabled state and the state of the pipeline loaded flag (described below).

An interrupt status register provides information on the interrupt source or sources generating the interrupt condition. The INT×PLS signal originates from the PLS block and is used by the Interrupt Control Unit. This signal becomes active when one or both of the PLS interrupt-generating events has occurred (subject to the state of the interrupt enable bits in the interrupt enable register). Reading the interrupt status register will clear all active interrupt indications in the PLS block and release the INT×PLS signal. Also, disabling an interrupt generation source in the interrupt enable register will clear a pending interrupt from that source. If no other interrupts are then pending in the PLS block, the INT×PLS signal will be released.

Hardware Pipeline Mechanism—The pipeline mechanism is provided so that modifications to the wave-form characteristics can be applied with no resultant wave-form distortion. The following pipeline registers are provided to hold the new values for cycle time, pulse width, etc:

Cycle time pipeline register is used to store the new cycle time value.

Delta cycle time pipeline register is used to store the new delta cycle time value.

Pulse count/width pipeline register, is used to store the new pulse count or pulse width value (if in PTO mode, this register stores a new pulse count and the full 32-bits of the register are used. If in PWM mode, this register stores a new pulse width value and only the lower 16-bits of the register are used).

A pipeline loaded flag is implemented as part of the interface between the PLS block and software when using the hardware pipeline mechanism. The pipeline loaded flag is set whenever the software writes a value to the least significant byte of the pulse count/width pipeline register. Therefore, to use the hardware pipeline mechanism, the software must always write a value into the pulse count/width pipeline register and it must be the last pipeline register to be written.

All pipeline registers must be loaded by software since the contents of all pipeline registers will be transferred to the operating registers. In PWM mode, software does not need to write to the delta cycle time pipeline register because the delta cycle time register is held at 0 while the PLS block is in PWM mode. Any contents of that pipeline register are effectively discarded.

Once the pipeline registers are written and the pipeline loaded flag is set, the contents of the pipeline registers will be transferred to the operating registers under the following conditions:

If the PLS block is enabled, the transfer will be made upon the occurrence of the PTOComplete event, if in PTO mode, or the CycleDone event, if in PWM mode.

If the PLS block is disabled, the transfer will be made immediately when the PLS block is enabled by software After the transfer to the operating registers is made, the pipeline loaded flag will then be automatically cleared.

Once the pipeline loaded flag is set in an enabled PLS block, the software is prevented from writing into any of the pipeline registers until their contents have been transferred into the operating registers (signified by the clearing of the pipeline loaded flag by the ASIC). If the PLS block is disabled, then the pipeline registers may be written by software with no restrictions and each time that the least significant byte of the pulse count/width pipeline register is written, the pipeline loaded flag will be set.

Auto-disable Mechanism—An enabled PLS block in PTO mode can be automatically disabled under the following conditions:

The PTOComplete event occurs and there is no new wave-form setup stored in the pipeline registers (the pipeline loaded flag is 0).

The AdderError event occurs.

When the PLS block is automatically disabled, the master enable bit in the control register is cleared by the ASIC. The pipeline loaded flag is not affected. Manual Disable—Whenever the master enable bit in the control register is cleared by software, the PLS block will immediately enter the PTO Disabled State or the PWM Disabled State (described below), dependent upon the current operating mode of the block. A software disable will also clear the pipeline loaded flag and any pending interrupts.

Figures 14B, 15:
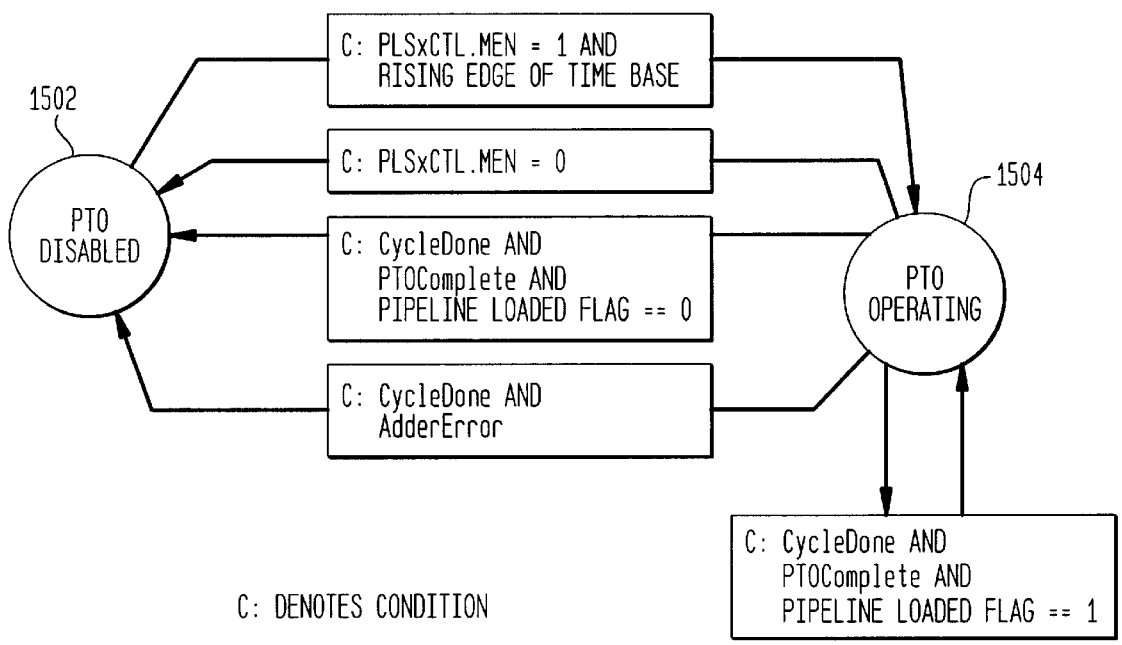
FIG. 14b is a table of registers of the pulse output block.
FIG. 15 is a state diagram of the pulse output block.

Valid Register Ranges—The table in FIG. 14b shows the range of valid values for each of the numeric registers in the PLS block.

PTO Operation

This mode is selected by enabling the PLS block. Software will control the cycle time, the delta cycle time, and the pulse count. The duty cycle is fixed at 50%. Therefore, the following functionality of the PLS block is enabled for use in this mode:

The cycle time preset and cycle time pipeline registers.

The delta cycle time and delta cycle time pipeline registers.

The pulse count/width preset and pulse count/width pipeline registers (configured to hold the 32-bit pulse count).

The 32-bit pulse counter.

The 16-bit cycle time counter.

The comparison to generate the CycleDone event.

The comparison to generate the PTOComplete event.

The comparison to control the state of PLS×OUT.

The pipeline loaded flag.

The PTOComplete and the AdderError interrupts.

Major state transitions of the PLS block in PTO mode are shown in the state diagram 1500 of FIG. 15.

When the PLS block is in the PTO disabled state 1502:

The QB0.x output is controlled by Output Point State Register instead of the PLS block.

The cycle time counter and the pulse counter are held at 0.

The PLSxSTAT.EN status bit indicates disabled.

When the PLS block is in the PTO operating state 1504,

The QB0.x output is controlled by the PLS block (through the PLSxOUT signal).

The PLSxSTAT.EN status bit indicates enabled.

Normal PTO operation is enabled.

The cycle time counter is incremented on the rising edge of the PLS time base and most of the functionality of the PLS block is driven, either directly or indirectly, from that counter. The segment in FIG. 16 of pseudo-code outlines the ASIC actions in PTO mode occurring on a rising edge of the PLS time base (the order of the actions is important, so assume top-to-bottom evaluation of these statements). The skilled practitioner will instantly appreciate the operation of the ASIC in PTO mode from the pseudo-code.

PWM Operation

This mode is selected by enabling the PLS block. Software will control the cycle time and the pulse width. Therefore, the following functionality of the PLS block is enabled for use in this mode:

The cycle time preset and cycle time pipeline registers.

The pulse count/width preset and pipeline registers (configured for a 16-bit pulse width).

The 16-bit cycle time counter.

The comparison to generate the CycleDone event.

The comparison to control the state of PLSxOUT.

The pipeline loaded flag.

The delta cycle time register and the delta cycle time pipeline register are held at 0 and the pulse counter and interrupt generation for the block are disabled. The INTx PLS signal should always be driven to the inactive state in this mode. Major state transitions of the PLS block in PWM mode are shown in the state diagram shown in FIG. 17.

When the PLS block is in the PWM disabled state 1702:

The QB0.x output is controlled by the Output Point State Register instead of the PLS block.

The cycle time counter is held at 0.

The PLSxSTAT.EN status bit indicates disabled

When the PLS block is in the PWM operating state 1704,

The QB0.x output is controlled by the PLS block (through the PLSxOUT signal).

The PLSxSTAT.EN status bit indicates enabled.

Normal PWM operation is enabled.

The cycle time counter is incremented on the rising edge of the PLS time base and most of the functionality of the PLS block is driven, either directly or indirectly, from that counter. The segment shown in FIG. 18 of pseudo-code outlines the ASIC actions in PWM mode occurring on a rising edge of the PLS time base (the order of the actions is important, so assume top-to-bottom evaluation of these statements). The skilled practitioner will instantly appreciate the operation of the ASIC in PWM mode from the pseudo-code.

Pulse Train Output Profile Instruction (PTOP)

The pulse output function provided by the ASIC is primarily intended for use in controlling stepper motors. The PLC provides a user instruction for the generation of profiles for acceleration/deceleration and running of stepper motors. This instruction is shown in FIG. 19.

Expansion I/O Unit.

Overview of Expansion Bus Concept

Physically, the expansion subsystem consists of enclosed I/O modules which are mounted independently, without a common back plane. A ten conductor ribbon cable which is part of each module is used to connect to the preceding module or the CPU. This cable carries the 5V power and logic signals required for the modules operation. See FIG. 20. The signals in the I/O expansion bus are described in FIG. 21.

Figure 22:
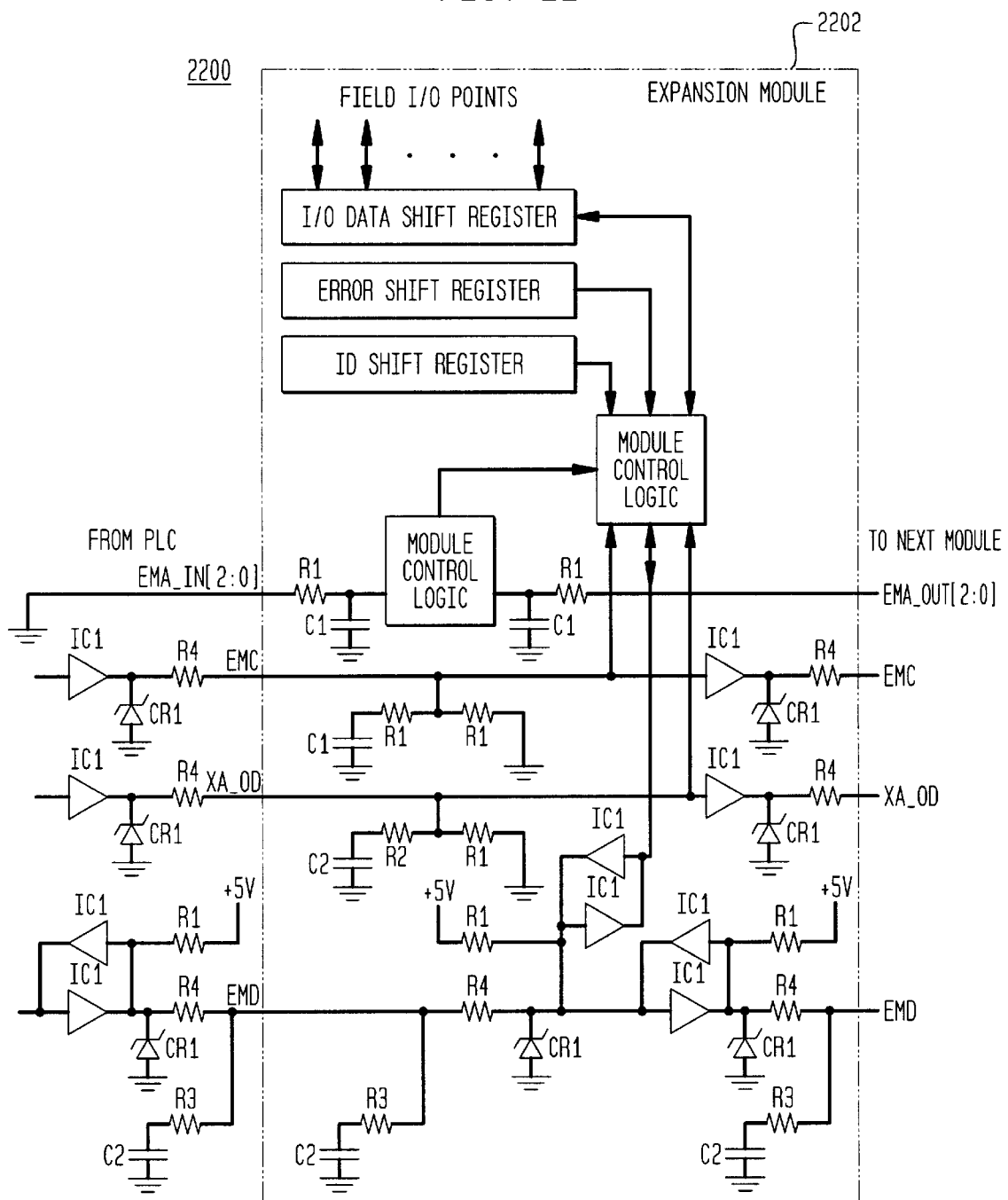
FIG. 22 is a block diagram of the I/O expansion module.
Figure 25:
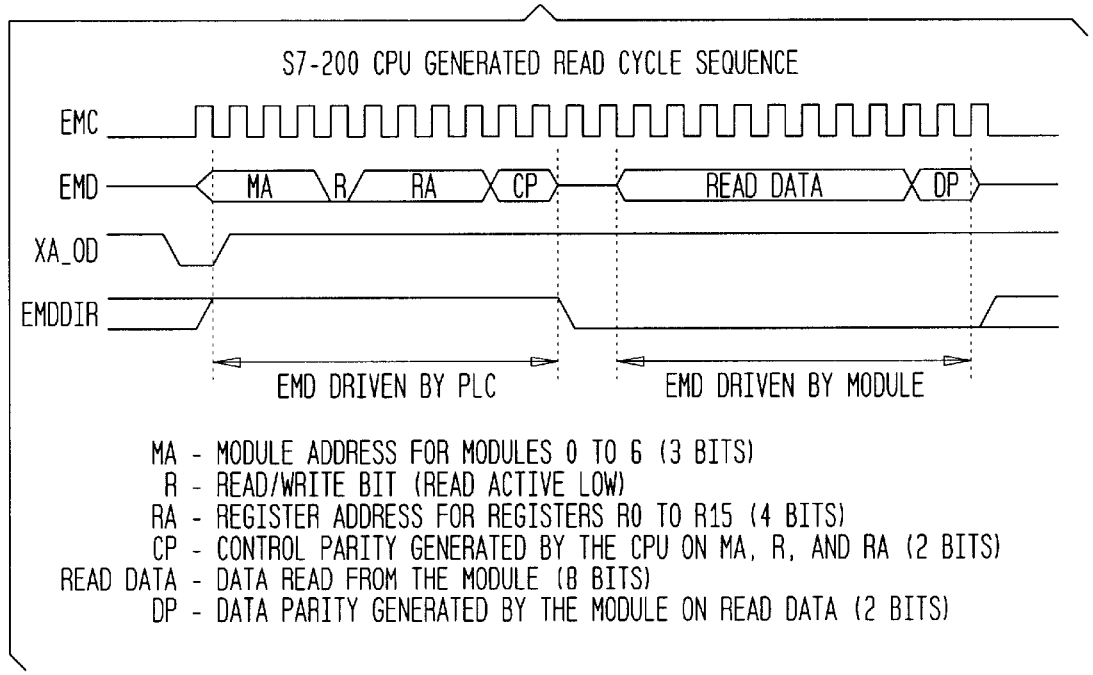
FIG. 25 is a timing diagram of the read cycle.
Figure 26:
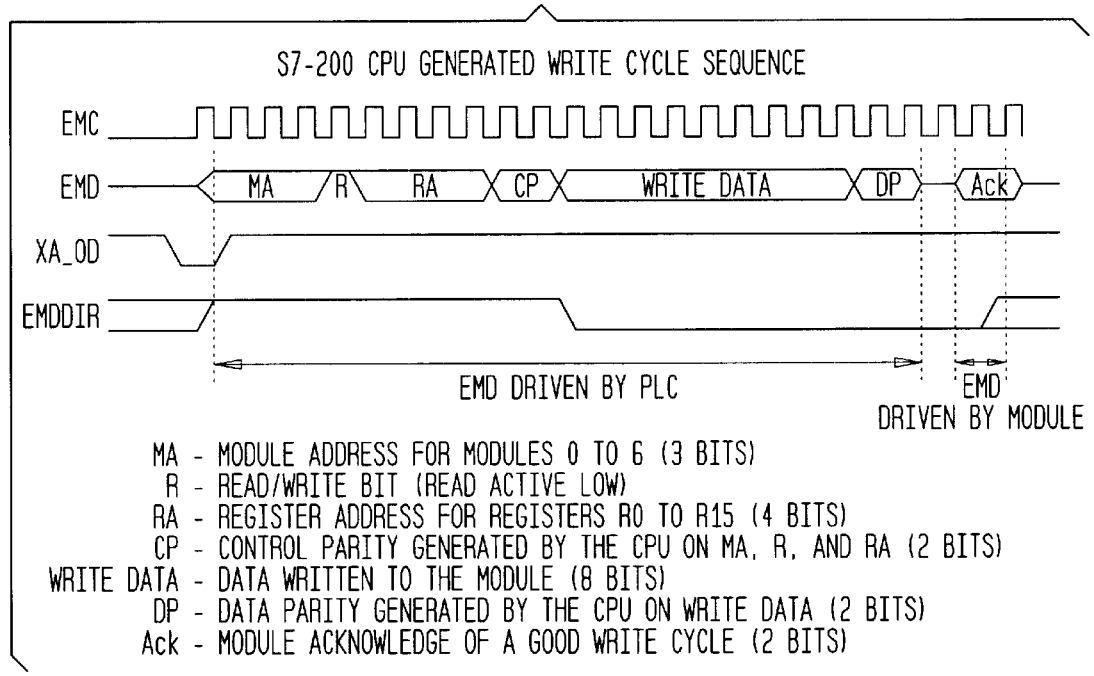
FIG. 26 is a timing diagram of the write cycle.

While all signals are physically daisy-chained through the modules, only EMA signals are logically broken and regenerated at each module. All other signals form a single electrical bus that extends the length of the I/O module chain. The value of the EMA signals is incremented before it is passed to the next module. Each access to the expansion I/O bus includes a module address field for selection of the module to be accessed. Only the module whose address matches the module address field of the message will respond to the access. This scheme allows arbitrary mixes of I/O module types to be concatenated without address switches and without a fixed back plane. Logical expansion of up to 8 units is possible with three EMA signal lines, however only 7 modules are allowed at present. Of course, other expansion units are possible. FIG. 22 shows the logical structure 2200 and the signal flow of I/O modules 2202 in the present invention. The details of the I/O expansion logical structures are not herein described. The table in FIG. 23 gives the values for each of the components used in the electrical interface of an expansion I/O module. The tables in FIG. 24 describe the electrical characteristics of the I/O bus signals. Access to expansion I/O is controlled by the ASIC in the CPU and will be understood from the diagrams in FIGS. 25 and 26 which illustrate the read and write cycle sequences as seen on the expansion I/O bus.

The ASIC (Master State Machine and Transaction Timing)

The following describes the bus transaction sequence. EM bus timing is arranged to provide time for propagation delay and signal skew where needed. The master provides signals on falling edge clocks of EMC, to be latched by the slave on the next rising edge. One half EMC clock time is allowed to cover set up of the data to the slave, and allow for worst case skew of EMC vs. EMD through the ASIC buffers, external cables, and possible repeater station buffers. The slave presents data on rising edges of EMC, and the master latches data on the following rising clock edge. This allows a complete clock time for propagation of the clock to the slave, slave clock-to-output delay, and return propagation time.

During a bus transaction, register fields are presented on the bus most significant bit first. The P1 bit of the 2-bit parity field is presented first, then the P0 bit. The master state machine actions are described with respect to both the rising and falling edges of EMC while the slave is assumed to have no other time base than EMC and may operate completely on EMC rising edges. EMC is driven low when not in use, to minimize possibility of clocking false data into slaves.

Bus Transaction Sequence

The following paragraphs describe the various components of the EM bus transaction sequence, both when writing data to the slave and when reading data from the slave. The following actions are assumed to be generated from the master (the EM Unit) unless they are specifically attributed to be performed by the slave. The following text and the subsequent clocking diagram will assist in understanding the transaction sequence.

Sequence Start—An EM bus transaction is triggered by a software write to the EM0START or EM1 START register. The in-progress bit of the EM status register is set immediately. Further write accesses to EM registers are disabled by the ASIC while the in-progress bit is set to avoid disturbing the bus sequence in progress. It is the responsibility of software to ensure that new bus transactions are triggered only when the EM Unit is idle (in-progress bit is low). The bus transaction is clocked from the EMC0 signal, if the sequence was triggered by a write to the EM0START register. If the sequence was triggered by a write to the EM1START register, then the bus transaction is clocked from the EMC1 signal. The actual start of the EM bus sequence (referred to as EMCST) occurs on the first falling edge of the EMC time base after the transaction trigger.

Module/Register Address—At point EMCST, the master drives the XA_OD signal low and enables the EMC and EMD signals. The detection of an active XA_OD on a rising edge of EMC is used by the slave to identify the start of an addressing operation. The master then produces 10 clocks on the EMC signal, clocking the contents of the EMADDR register and 2 parity bits, P1 and P0, in sequence on EMD. The first bit of EMADDR presented on EMD is valid at the EMCST point. The XA_OD signal is driven high again at EMCE↓ 1. The master presents a new bit on EMD at each EMC↓. The EMD signal is released at EMC↓ 10. The slave latches valid information at EMC↑ 1:10 (rising edge of EMC 1:10).

Read Data Sequence—For a read transaction, the EMD-DIR signal is driven to the low state at EMC↓ 10. After the clocking of the module/register address bits, the master produces 13 more clocks (11:23) on the EMC signal. EMC clocks 11:12 are idle clocks to allow the slave time to make the appropriate register data and parity available for transfer. The selected slave provides 8 data and 2 parity bits on the EMD signal at EMC↑ 13:22 and returns to idle state at EMC↑ 23 (the slave releases the EMD signal at this time). The master latches information at EMC↑ 14:23. The slave provides the most significant bit of the data value first, then the P1 parity bit, and finally the P0 parity bit. The data value is stored in register EMDATA. The master determines the parity of the value stored in EMDATA and compares this calculated parity against the parity bits received from the slave. If the calculated parity and received parity do not agree, then the error bit in the EM status register is set. Otherwise, the error bit is cleared. The EMDDIR signal is released (driven high) on EMCE 23.

Write Data Sequence—For a write transaction, after the clocking of the module/register address bits, the master provides 14 more clocks (11:24) on EMC. The master provides the 8 data bits (from the EMDATA register) on EMD followed by the 2 parity bits (P1 then P0). The master presents the data and parity bits at EMC↓ 10:19, then releases the EMD signal and drives the EMDDIR signal to the low state on EMC↓ 20. The slave latches valid information at EMC↑ 11:20 . The slave responds to a complete write cycle and correct parity by clocking the bits 0 then 1 from EMD at EMC↑ 22:23. The master latches this acknowledge response on EMC↑ 23:24. The slave returns to idle state and releases EMD at EMC↑ 24. If the 2-bit acknowledge value read by the master is not 01, then the error bit in the EM status register is set. Otherwise, the acknowledge value is correct and the error bit is cleared. The EMDDIR signal is released (driven high) at EMC↓ 24.

Sequence End—The end of the bus sequence is defined to occur on the first rising edge of the EMC time base following EMC↓ 23 (read transaction) or EMC↓ 24 (write transaction). At EMCND, the in-progress bit of the EM status register is cleared. The error bit must be valid when the in-progress bit is cleared. The bus signals should be at their idle states.

Parity Check Bits

Two parity bits are used to indicate the parity of a single 8-bit value. Each of the 2 parity bits represents odd parity on 5 bits of the value, as shown in the table of FIG. 27. Odd parity on odd number of bits ensures that fields of all 1's or all 0's have opposite polarity parity bits.

Software Interface Considerations

A typical EM bus transaction will include software writing the EMADDR register, writing a data byte to the EMDATA register (if a write transaction), then writing to the EM0START or EM1START registers to initiate the sequence. The software will repeatedly read the in-progress bit of the EM status register to determine when the transaction is complete. On completion of the EM bus transaction, the in progress bit will be cleared and the error bit will be set appropriately. The data value can now be read from the EMDATA register if a read transaction was performed. Software may ensure that only the EMSTAT register is read while the transaction is in progress and the EM Unit may be designed to correctly handle a read access of that register by the software at any time.

If an interrupt event occurs while a EM bus transaction is in progress and the interrupting routine requires the use of the EM Unit, then that routine may sample the state of the in progress bit and wait for the transaction to complete before accessing any other EM Unit registers. Such interrupt routines will have an obligation to save and restore the contents of the EMADDR and EMDATA registers as well as the state of the error bit. This is required so that those registers will contain the correct values for the bus transaction started by the interrupted routine once control is returned back to that routine.

Output Disable using the XA_OD signal

The XA_OD signal serves the dual use of identifying the start of address cycle and the occurrence of a output disable condition (caused by a CPU system fault). At the slowest expected bus rate of 1 MHz, the longest normal assertion of XA_OD in address usage is ~1 μs. A threshold of 100 times this, or 100 μs for slave recognition of XA_OD as an output disable allows for a simple diode/R/C filter at the slave and gives an adequately responsive output disable function. The XA_OD external signal will be the logical OR of the address cycle identification signal from the EM bus state machine and the outputs OK signal originating from the Watchdog Timer Unit.

User Program Memory

User program memory may be used to store the user program. The end of the main program may be terminated by the use of a MEND (main program end) instruction. The remaining portion of user program memory beyond the MEND instruction may be reserved for subroutines, and interrupt routines.

Serial Communication

The PLC provides a serial communication port as described with reference to FIG. 1. The communication port uses RS485 signal levels and is capable of running at 9.6 KB, 19.2 KB or 187.5 KB, while supporting the system communication protocols (PPI or DP/T). This port serves as the programmer interface to the PLC. In addition the port is available in the run mode for use as a general purpose communication port (referred to as freeport mode) under the complete control of the user program. In free port mode the communication port to is capable of operating at baud rates from 300 baud to 38.4 KB. The physical connection to the RS485 port is provided by a nine pin D connector.

Special Memory (SM) bits (see section 6.2, SM2, SM3, SM30 and SM130) are provided for free port use of the communications port. The default state of the special memory bits that control the use of the communication port enables the use of the communication port as a programmer interface. If the user program turns on the special memory bit that controls the communication port's use, the user program will be enabled to send and receive messages through the communication port. In this mode of operation the user can configure the port for any character based protocol desired (7 or 8 bits/character, odd, even or no parity, and baud rate). The port will operate in half duplex mode and the user program can operate the port in polled or interrupt mode. A receive character buffer is provided in the SM user area, along with a communication status register, and a configuration register, which includes the bit that controls the port's mode of operation. All communication functions except transmitting can be performed through the special registers in SM memory, Transmitting can only be accomplished using the special write port message instruction. The user program never has direct access to the communications controller or the interrupt structure of the machine.

PPI Master and Slave Modes Network Read and Write

The PLC may function as a PPI Slave. In PPI Slave mode the PLC acts as a responder to communication messages.

In one arrangement of the invention, when the CPU is placed in the Run mode, the PLC can function as a PPI Master as well as a PPI Slave. The user can select PPI Master mode under the control of the user program stored in user program memory. In this arrangement, a well-known token-ring communication protocol may be implemented to effect communication between master and slave. In PPI Master mode the PLC is capable of holding the token and initiating PPI requests thereby enabling the user to access data in other CPUs via the network read and write instructions. When the CPU is not holding the token, it responds to all requests as a PPI slave. The communication buffer sizes for PPI communication are defined in the table shown in FIG. 28.

While the PLC is functioning as a PPI Master, it will maintain the network in accord with well-known communication standards (such as the PROFIBUS definition provided by the EN 50170 European Standard). The PLC will use the following algorithm for calculating the target token rotation time.

$$TTTR=(8+HSA)(256)(1/BR)$$

where

TTTR—is the target token rotation time

HSA—is the highest station address

BR—is the baud rate in bits per second

If upon receipt of the token, the target token rotation timer has expired, the PLC will immediately pass the token to the next token holder without sending any messages that may have been queued prior to receipt of the token.

Freeport Link Provided in PPI Master Mode

Figure 30A:
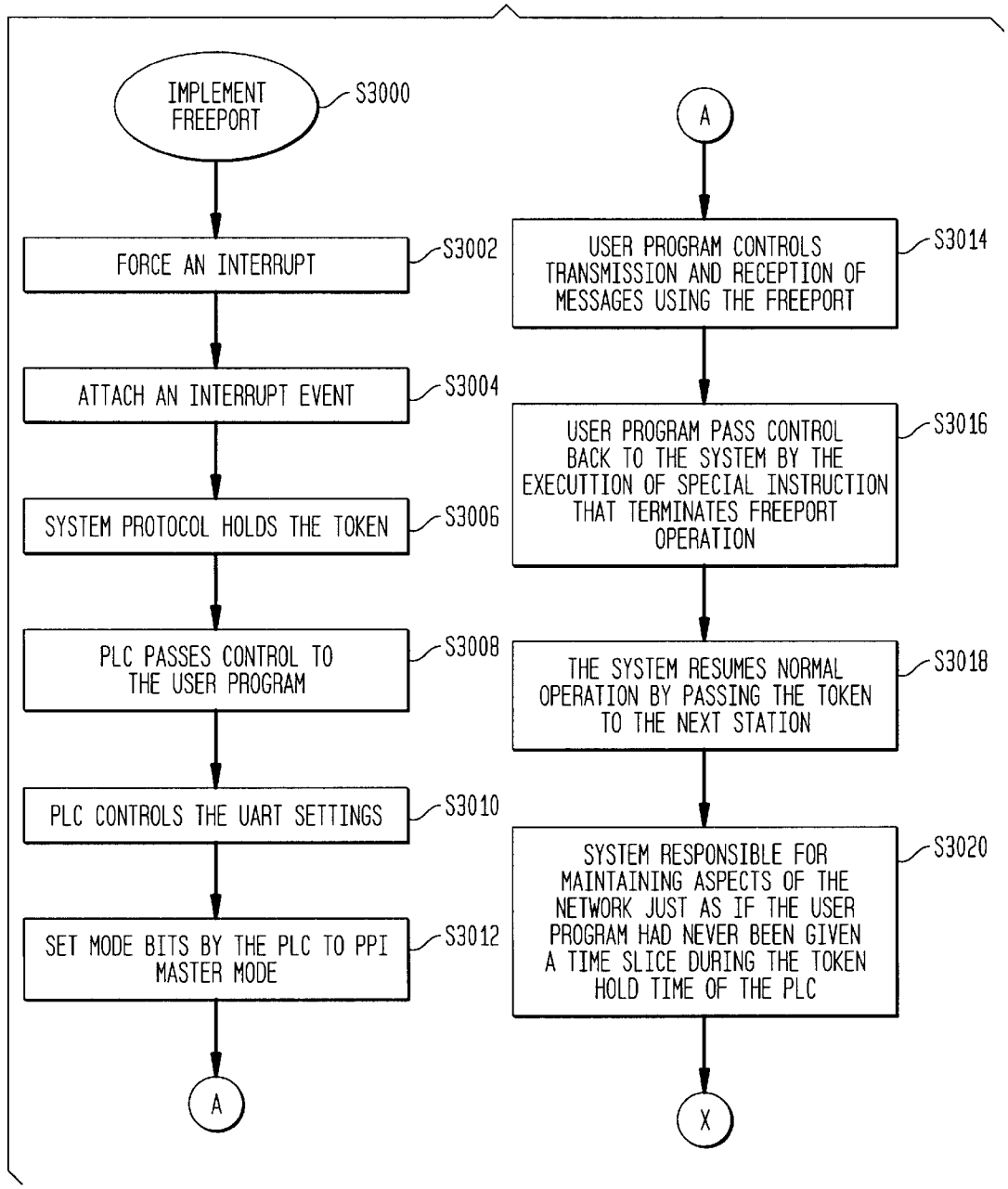
FIG. 30a is a flow chart of the free port.

The present invention provides free port operation of the communications port, hereinafter "freeport", that allows the user to control the port either manually or by operation of a user program. The procedure of freeport operation is shown in FIG. 30a.

In the instant invention, the user implements freeport (step S3000) use by forcing an interrupt (step S3002) of the PLC according to the afore-described interrupt architecture. In this case, the user initiates freeport communication while operating the PLC in master mode by attaching an interrupt event that will pass control of the communications port to the user program (step S3004). This is performed while the system protocol holds the token (step S3006).

In response, the PLC passes control to the user program (step S3008). The PLC controls the UART settings (step S3010) in accordance with the SM bit definitions SMB30 and SMB130 shown in FIG. 30b. In that instance, the mode bits of SMB30 and SMB130 definitions are set by the PLC to PPI master mode (step S3012).

Once control is passed from the system to the user's interrupt routine, the user program controls transmission and reception of messages using the freeport (step S3014). Once the user program has completed its task, the user program may pass control back to the system by the execution of a special instruction that terminates freeport operation (step S3016). The instruction used to terminate freeport operation is described in the table shown in FIG. 29. The system will then resume normal operation by passing the token to the next station (step S3018). The system is responsible for maintaining all aspects of the network just as if the user program had never been given a time slice during the token hold time of the PLC (step S3020).

Built In Freeport Protocol

In order to provide higher performance for communication using PPI protocol, a built-in protocol selection option is provided for the PPI protocol. When the PLC is placed in the RUN mode and the freeport PPI protocol is selected by the value written to SM30 or SM130, the communication port will be configured according to the values written into SM30 or SM1 30. When freeport mode is exited, the PLC will revert back to the default PPI protocol at the selected baud rate. The code for selecting freeport PPI protocol will be as defined by SM30 (port 0) and by SM1 30 (port 1). The table in FIG. 30b gives the definition of SM30 and SM130.

Freeport Receive Message Interrupt

In order to simplify the programming for freeport communications, the PLC supports a receive message instruction that may be used in conjunction with a receive message event interrupt. The user specifies the conditions that are required to define the beginning and end of a message. The PI.C supports the following message condition specifications:

Port 0:

SMB86—Message Status Byte: Indicates termination conditions

SMB87—Message Control Byte: Enables the selected message receive criteria

SMB88—Start Character: The character that uniquely identifies the start of a new message SMB89—End Character: The character that uniquely identifies the end of the message SMW90—Idle Line: Time period after which the first character received starts a new message SMW92—Inter-character/Message Time Out: The maximum time allowed between characters or for the message to be received. Usage is determined by the message control byte.

SM694—Character Count: The maximum length of the receive message Port 1:

SMB86—Message Status Byte: Indicates termination conditions

SMB87—Message Control Byte: Enables the selected message receive criteria

SMB88—Start Character: The character that uniquely identifies the start of a new message SMB89—End Character: The character that uniquely identifies the end of the message SMW90—Idle Line: Time period after which the first character received starts a new message SMW92—Inter-character/Message Time Out: The maximum time allowed between characters or for the message to be received. Usage is determined by the message control byte.

SMB94—Character Count: The maximum length of the receive message

The first byte of the receive buffer is used as a character counter which may indicate how many characters were received by the receive message function. The definition of each of these special memory registers is given in the table shown in FIGS. 30c and 30d.

DP_S7 Communications

The PLC may support the DP/T protocol that provides a MPI transport for Master-Slave communications. PPI messages are completely compatible with the DP/T messages, so no special selection of protocol is required. The PLC may accept either a PPI request or a DP/T request and respond accordingly. Support for DP/T communications over the PPI port may include being HD4 compliant on transmissions from the PLC at all baud rates supported.

While PPI is a connectionless protocol, DP/T is a connection oriented protocol. The table of FIG. 30d defines the number of DP/T connections and the buffer size for each connection supported by each PLC on each port. This table does not include the buffer for the default SAP that may be supported on each port.

Modem Communications

The CPU of the present invention supports communications over standard 10-bit, full duplex modems. This is considerably important because the newer 11-bit modem in wide useage is often times too expensive. It was discovered that this is particularly true in the industry setting where industrial technology typically lags behind the state-of-the-art in computer hardware. On the other hand, the old 10-bit modems are plenty to be found on the industrial floor. This invention takes advantage of the discovery that there are a surplus of 10 bit modems in industry and, therefore, provides a unique 10-bit protocol that allows the PLC of the present invention (or any PLC or processor for that matter) to connect to factory floors so equipped. Of course, the 10-bit protocol of the present invention is valuable, and is applicable, to other settings where 10-bit modems are employed.

Another advantage of the 10-bit protocol of the present invention is that the 10-bit protocol is compatible with higher order bit protocols. Thus, the 10-bit protocol may be received by an 11-bit modem or higher.

The 10-bit protocol of the present invention is counter to conventional wisdom. Of course, it runs counter to intuition to employ lesser bits than is capable by the latest modem technology. It is even further contrary to conventional wisdom to employ the 10-bit modem protocol because the present invention sacrifices the parity bit, the finch-pin upon which all remote communications rely to ensure integrity of data. Indeed, when it is considered that PLCs are responsible for controlling machinery, e.g., heavy equipment or precision robotics, it is realized that the company may be put out of business or, worse, someone is injured by the improper commands of a PLC. The ordinary practitioner would counsel strongly against a 10-bit protocol.

Figure 31:
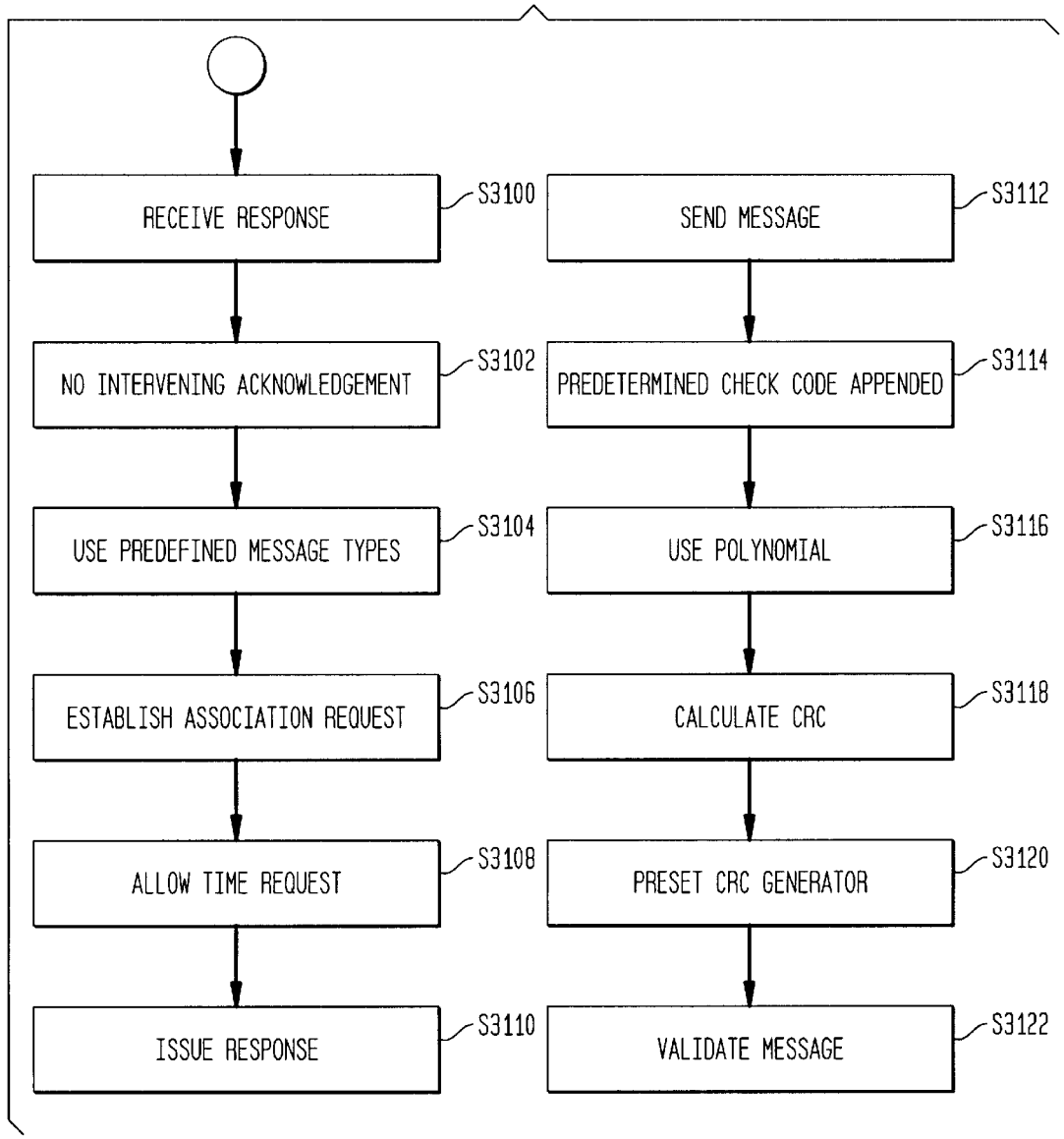
FIG. 31 is a flow chart of the modem protocol.

The 10-bit protocol of the present invention is described with reference to FIG. 31. In one arrangement, the protocol used for modem communications is a modification of the standard PPI protocol. Of course, other bit assignments are possible. The PPM or Point to Point Modem protocol specified here assigns the following bits:

1—Start bit
8—Data bits
1—Stop bit
0—Parity bits

In the PPM protocol each request from the master receives a response without an intervening acknowledgment or poll (step S3100). It is recommended that only SD2 message types defined for PPI protocol are used in the PPM protocol (step S3104). In order to fulfill this requirement the master device may specify the use of the Master/Slave protocol (DP/T) in the establish association request (step S3106). After each request, the master may allow, for example, 15 seconds for the slave device to respond before timing out the transaction (step S3108). Upon receipt of a request, the slave will allow a minimum turn around time of, for example, 20 milliseconds before issuing the response (step S3110).

Each request/response message is preferably a SD2 PPI message (step S3112) with a sixteen bit CRC check code appended as the last two bytes of the message (step S3114). The CRC uses the industry standard polynomial (X16+X12+X5+1) which is known as the CRC-CCITT polynomial (step S3116). The CRC is calculated over the entire SD2 frame excluding start and stop bits (step S3118). The CRC generator may be preset to all ones for both transmission and reception (step S3120). In this case, receipt of a valid message produces a pattern of 0x1 D0F (step S3122).

The PPM protocol is signaled to the. PLC by grounding pin 9 of the communication port connector, The PLC provides an internal pullup resistor on this pin in order to select standard PROFIBUS protocols.

It will be appreciated that the 10-bit modem protocol of the present invention is not necessarily limited to 10 bits and may be extended to any number of bit configurations including, for example, $\{1, 2, 3 \ldots 9, 10, 11 \ldots \infty\}$. Indeed, the present invention may be better considered an n-bit protocol that does not include a parity bit. The n-bit protocol may be implemented using the foregoing description to ensure data integrity.

Hiding Portions of the User Program

The PLC of the present invention provides for the protection of proprietary software or code. The same feature allows the PLC to hide portions of code from the user that may not be intended for the user's viewing such as code generated by the PLC for performing routine operations of the PLC. It will be appreciated that this function encourages third party software developers to provide software who would otherwise shy away because the code is otherwise available to users.

To that end, the PLC supports a HIDE instruction that allows the user (or programming device) to identify and hide portions of the user program. The PLC programs are transferred and stored in the user program memory with the hidden code sections encrypted. The PLC decrypts the hidden code sections at compile time for the purpose of generating the executable program. Once compilation has been completed, the hidden code sections are re-encrypted.

A user supplied password capability is provided that is used to encrypt the portion of the program that is to be hidden. In this way only the person with authorization will be able to view the program sections that are hidden.

Figure 32B:
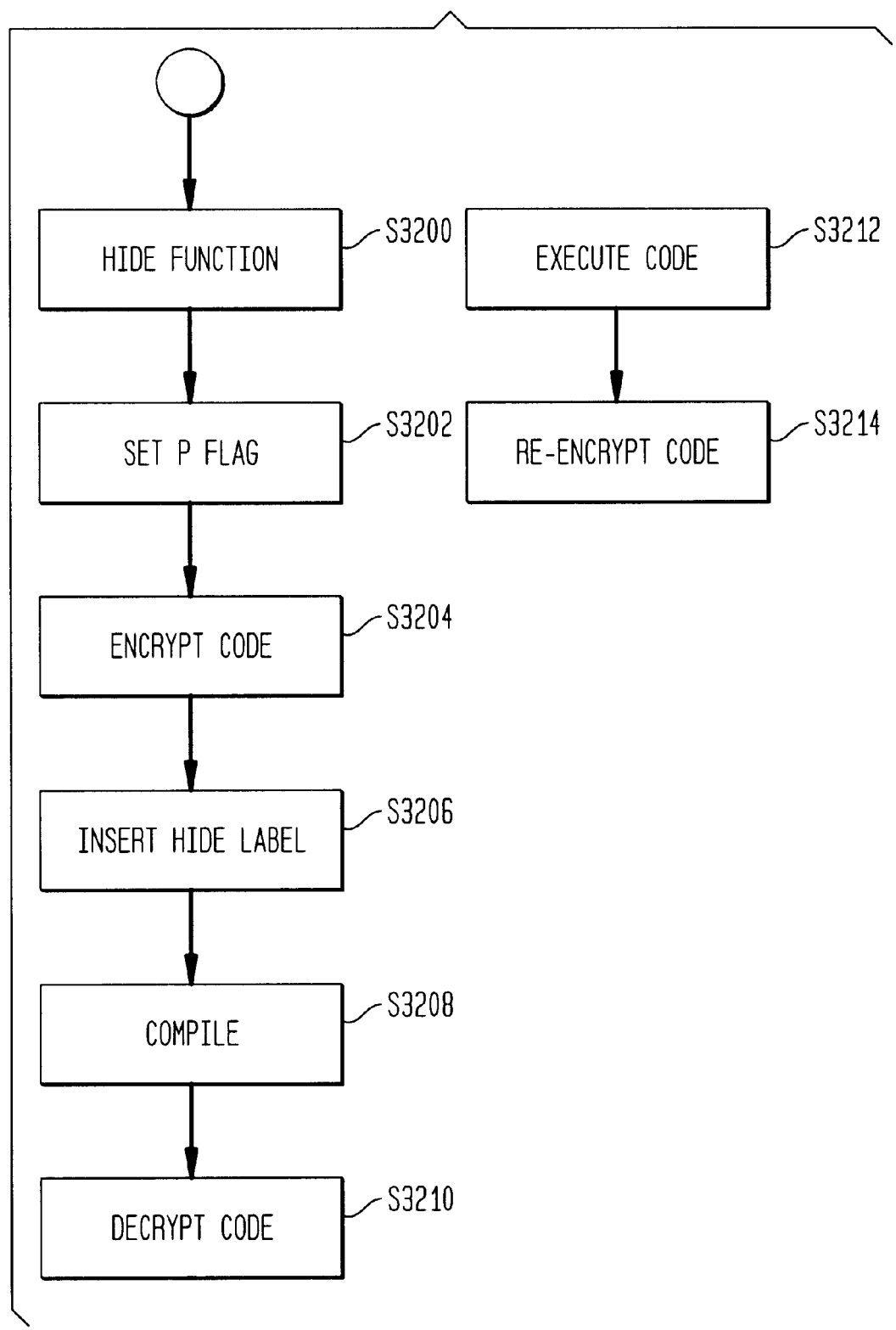
FIG. 32b is a flow chart of the hide instruction.

As shown in FIG. 32a, the hide instruction of the present invention marks the start of the encrypted portions. In the invention, a flag P is set to indicate that encrypted code exists. Now with reference to FIG. 32b, the operation of the hide function shall be described. In Step S3200, the user invokes the hide instruction for a particular piece of proprietary code. In response, the PLC causes the P flag to be set (Step S3202). The PLC encrypts the code with a password that may be provided by the user (Step S3204) and inserts the hide label in the user memory at the beginning and end of the code to ear-mark the encrypted portion (Step S3206). Upon compilation of the user program (Step S3208), the PLC causes the encrypted portion to be decrypted (Step S3210) and the user program executes normally (Step S3212). Once execution of the program is complete, the PLC re-encrypts the proprietary code (Step S3214).

User Passwords

Restricted access to the PLC functions and memory may be provided through the use of a password which allows the user to configure access restrictions. Without a password the PLC may provide unrestricted access. When the PLC is password protected, the PLC may prohibit all operations that are restricted according to the configuration provided at the time the password was installed. The PLC may allow one station to legitimize the communication link so that the user of that station can have unrestricted access. The user who knows the to password may reconfigure the restrictions at any time by entering the correct password and editing the restriction class. Users who do not know the password must live with the restrictions assigned by the person who knows the password.

In the event that the user forgets a password, the master password may be used to gain access to the PLC. For the master password to work, the PLC mode switch may be in either the STOP or TERM position. When the master password is used the following actions are taken by the PLC software:

1. The PLC will transition to the STOP mode
2. The user program (OB1) is cleared (deleted)
3. The user data memory (DB1) is cleared (deleted)
4. If SDB0 exists, all parameters of SDB2 except the station address and baud rate will be copied to SDB0
5. All SM flags are set to their default state
6. All flags are cleared
7. All SCR bits are cleared
8. Analog outputs will be frozen
9. All system data memory is set to the default state
10. All forced points are cleared and unforced
11. The time of day clock will not be changed
12. All timer/counter current data is cleared
13. The internal EEPROM is initialized (OB1 and DB1 are deleted and SDB2 is copied to SDB0 with the exception of the station address, and all inputs, outputs and data values are unforced)

System Function Call Support

The PLC 100 supports System Function Calls (SFCs) which allow the user to upload customized functions to the PLC.

In general, SFCs may be created, for example by the Siemens S7-200 development groups, and downloaded to the PLC by the programming device. The PLC supports at least two SFCs. The maximum size of each SFC is dependent on the resources available in the specific PLC. For the CPU envisioned in this invention the maximum size of each SFC is 8 KB including block header information. SFCs do not necessarily require any user data, although allocation of system data may be provided. SFCs downloaded to the PLC become part of the operating system of that PLC. The PLC further allows the SFCs to be uploaded, downloaded, deleted and copied to the memory cartridge. The PLC reports the existence of SFCs in the appropriate directory communication functions.

Figure 33B:
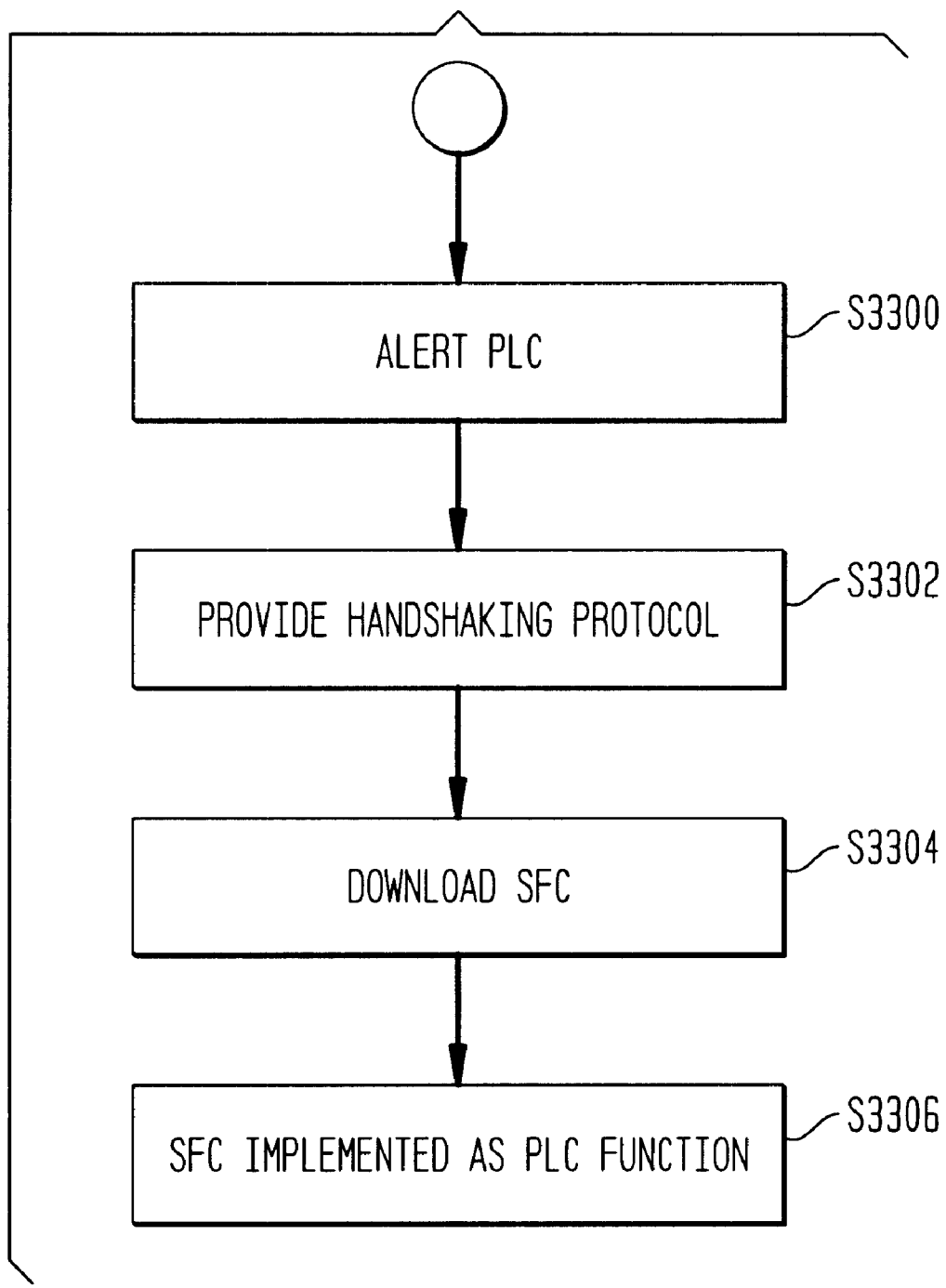
FIG. 33b is a flow chart of the system function call.

The exemplary SFC instruction is shown in the table of FIG. 33a. Now in more detail, FIG. 33b shows the method of the system function call. In Step S3300, the user alerts the PLC that an SFC download is desired. The PLC performs the necessary handshaking protocol for the download (Step S3302) and the SFC is downloaded (Step S3304). The PLC stores the downloaded function as part of the library of functions of the operating system (Step S3306).

Load New Operating System

The PLCs may use FLASH EPROM for the operating system storage support loading of a new operating system through the communication port. This is accomplished using a boot block in the FLASH EPROM that cannot be erased while installed in the PLC.

Loading of a new operating system can be accomplished by directly connecting a personal computer to the PLC using a PC/PPI cable. Use of PROFIBUS cards installed in a personal computer or part of a PG are not preferred because of the complexity of the PROFIBUS protocol which is the only protocol that can be used with these devices.

The definition of the protocol used to load the new operating system will be identified by design and each communication message will provide data integrity checks in the form of checksums or CRC codes. Verification of integrity of the new operating system is before normal operation is invoked, but after the FLASH EPROM has been programmed.

STL Status

It has been found that the conventional debugging system for debugging programs is flawed because the prior debugging system of the PLC debugs after execution of the entire program or significantly interferes with the timing of the program execution. To that end, the PLC supports the acquisition of the results of executing a group of instructions at the instance each instruction in the group is executed. This novel feature is done in real time and while the PLC is executing the instruction. In order to implement this function, the PLC instruments the compiled code segment for which status is to be gathered.

In one arrangement, the STL status is implemented on a display, such as provided by a human-machine interface coupled to the PLC as well-known. The size of the status window on the display will be determined by the number of operand values that may be returned. The PLC may reserve, for example, a 200 byte buffer for operand values. The size of this buffer is based upon the amount of data that can be returned in a single communication frame.

Only one STL status window is preferably supported. Supporting multiple windows requires additional RAM and it presents synchronization and triggering problems. Of course, with future developments in memory technology, it is possible that multiple windows are a possibility.

Only one device should be able to open an STL status window. The STL status window function will be associated with the station address of the device which opened the STL status window. As long as the STL status window remains open, all other requests for opening a STL status window will be rejected by the PLC In order to open a STL status window the programming device may identify the address of the first instruction in the window and then identify the number of instructions in the window. The basic format of the window specification is shown below.

| Instruction Address of Window Start | 2 Bytes |
|---|---|
| No. of Instructions in STL Status Window | 2 Bytes |

In this example, the only instruction address specified is the memory address of the first instruction in the window. The programming device bears the complete burden of making sure that the response data requested in the setup of the STL status window fits in the 200 bytes of the response buffer.

It is a tenet that the STL status display must not cross the boundary between program parts, e.g., Main to Sub, Sub to Sub, Sub to Int, Int to Int. That would cause a disruption.

Figures 34A, 34B:
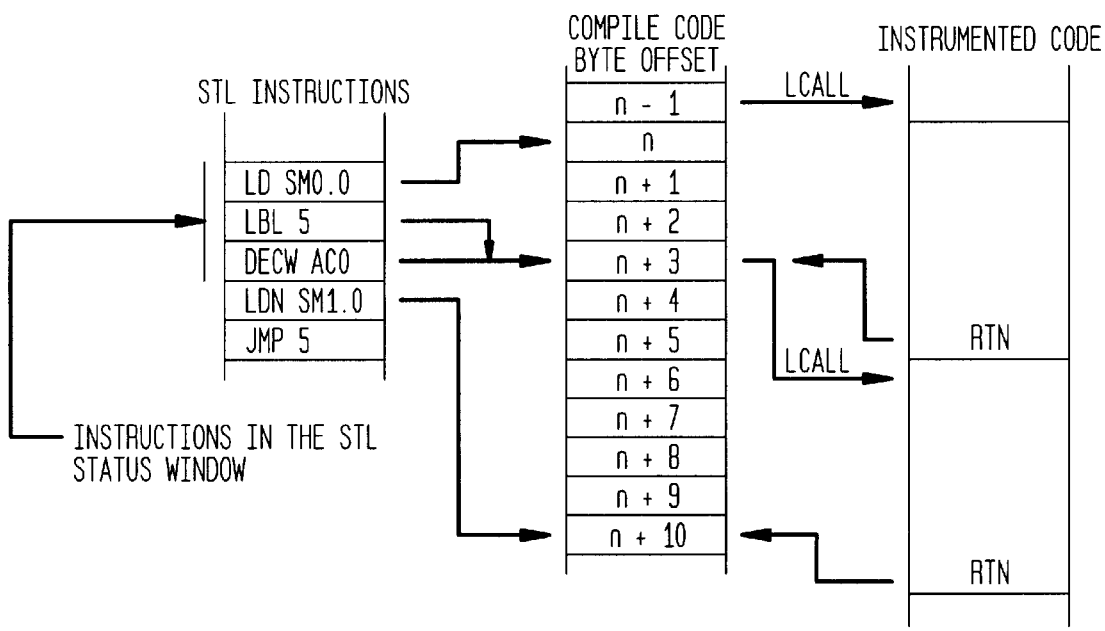
FIG. 34a is a table of STL instructions.
FIG. 34b is a system diagram of the STL function.

The exemplary format of the response buffer is shown in FIG. 34a, wherein the instruction address of the start of the STL status window is returned for positive confirmation that the PLC and the programming device are viewing the same window. The length field indicates how many bytes of data values are contained in the data area for each instruction. Now the codes will be described:

V 0—data for this instruction is not valid because the instruction was not executed this scan.
  1—data for this instruction is valid.
ENO The enable output bit that indicates if the instruction executed without error
SCR The bit value of the SCR stack.
S4–S0 S0 refers to the top of stack value and S1 refers to the next to top of stack value.
Data The STL status information returned for the instruction. The programming device is responsible for parsing the data based upon the request that set up the STL status window.

The PLC is responsible for making sure that the data captured in the STL status window comes from a single scan cycle. The PLC indicates this to the programming device using the Valid flag (V) that is provided with push down stack values for each instruction. Internally, the PLC tracks what is valid by using a scan counter value that is reset by a request for the STL status buffer and which is incremented each scan. When a value is to be written to the STL status buffer, the scan count status word for the buffer is compared to the current value of the scan counter. If the values are different, the scan counter value will be copied to the scan count status word for the STL status buffer and all V flags in the buffer will be cleared. Then the new values are stored in the buffer and the V flag for that instruction will be set. If the values of the scan counts are the same, then the new values will be stored in the buffer and the V flag for that instruction will be set. This allows the buffer to always be updated with the data from the last scan while keeping the data synchronized to the same scan.

Instrumenting the Compiled Code Window for STL Status

The apparatus and operation of the STL shall now be described simultaneously with reference to FIGS. 34b and 34c. The section of compiled code corresponding to the instructions in the STL Status Window is identified by the PLC (Step S3400) (shaded in the figure). The original compiled code in this shaded region is saved (Step S3402) and then restored once the STL Status operation is complete (S3420). Once the original compiled code has been saved, the instrumented code is compiled in another section of RAM (S3404).

In order to discuss the process of instrumenting the code a few terms need to be defined as follows:
  Compiled instruction—A compiled instruction is the machine code or executable code created by compiling a STL instruction. Generally, each STL instruction is compiled into multiple machine instructions.
  Instrumented instruction—An instrumented instruction is a compiled instruction along with the extra machine code required to save the status of power flow and the operand values.

In order to preserve the addresses of labels, for-next loops, subroutines and interrupt routines, each compiled instruction in the STL Status Window is replaced with a branch to the instrumented instruction (Step S3406). Each instrumented instruction is terminated with a return instruction which transfers control to the next compiled instruction (Step S3408).

The branch to the instrumented code is made using an LCALL instruction (Step S3410). The LCALL transfers control to the instrumented code that captures the STL status for that instruction (S3412). For those compiled instructions which are longer than three bytes, the return value is adjusted so that control will be transferred to the next compiled instruction (Step S3414).

The beginning address of the first compiled instruction in the STL Status Window may be determined before instrumentation (S3416). In order to reduce the amount of time required to determine this address, a table containing a pointer to the address of, for example, every twenty-fifth compiled instruction can be maintained (S3418). Such a table would require about 300 bytes for a 8192 byte user program. If more RAM is available, then the table of address pointers could point to every tenth compiled instruction which would further reduce the time for STL status instrumentation.

Figure 34C:
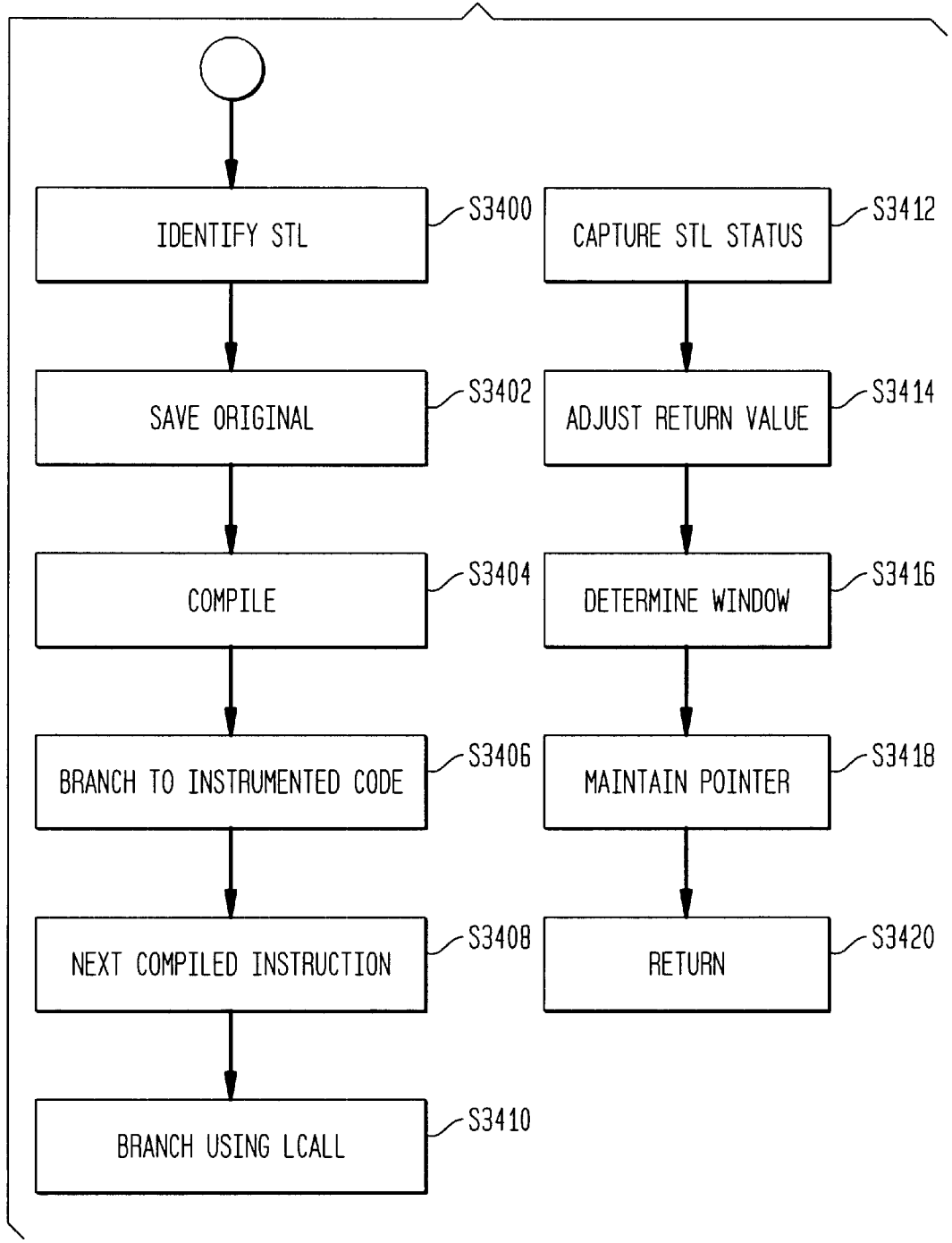
FIG. 34c is a flow chart of the STL function.

The PLC utilizes the table of FIG. 34c that lists the fastest Boolean instructions and shows what changes are required to compile the code so that all instructions are a minimum of three bytes in length. The instructions in the shaded portions of the table tells the PLC which instructions which may be modified.

The foregoing technique requires the least amount of RAM, but it also requires that all compiled code instructions take at least the number of bytes required by the LCALL instruction that will be used to branch to the instrumented code section. For purposes of clarity it is assumed in the above that the LCALL instruction takes three bytes and that all compiled instructions take three or more bytes.

Design Concept

The mechanical design concept for the PLC family is shown in FIG. 1. The design concept is a "Brick" style that will have the ability to have units connected for expansion. These expansions units will also be of the same style and shape. The design goal is to make this unit as cost effective as possible while maintaining the same family appearance as the Siemens S7-300™ and S7-400™ The PLC family will have the same color and text style as the S7-300™ and S7-400™ family.

Housing

Figures 35A, 35B:
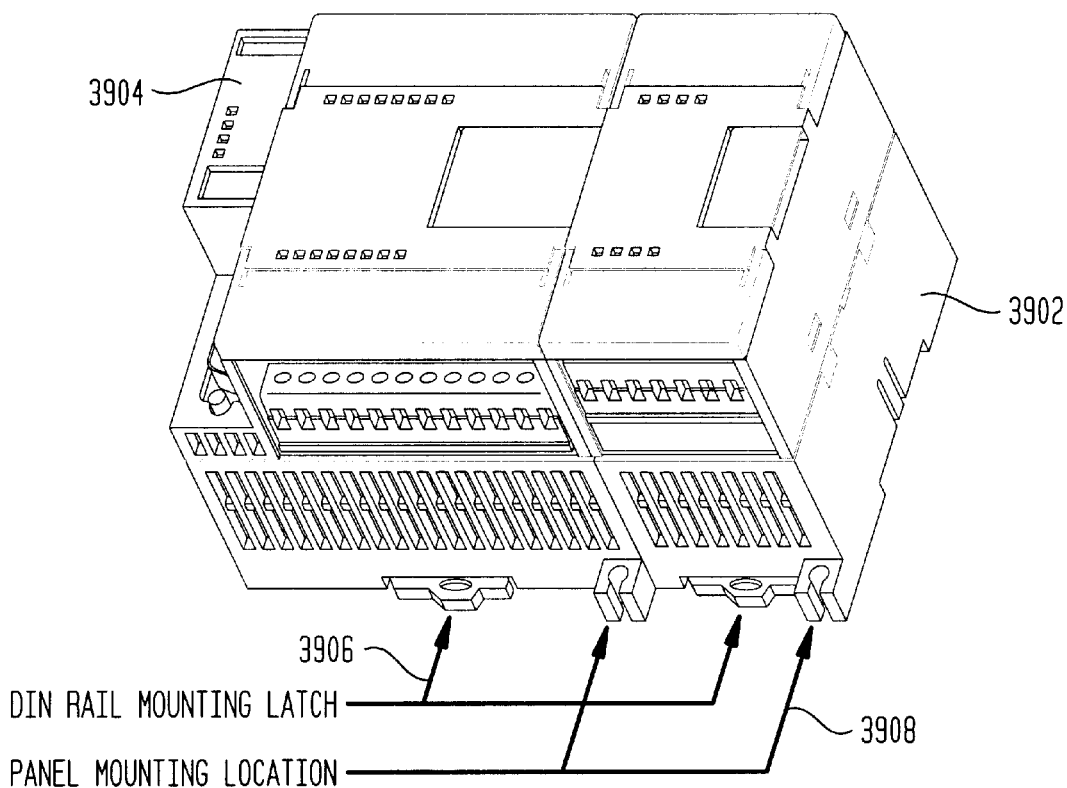
FIG. 35a is a table of PLC parameters.
FIG. 35b is a perspective view of the PLC and I/O expansion module.
Figure 36:
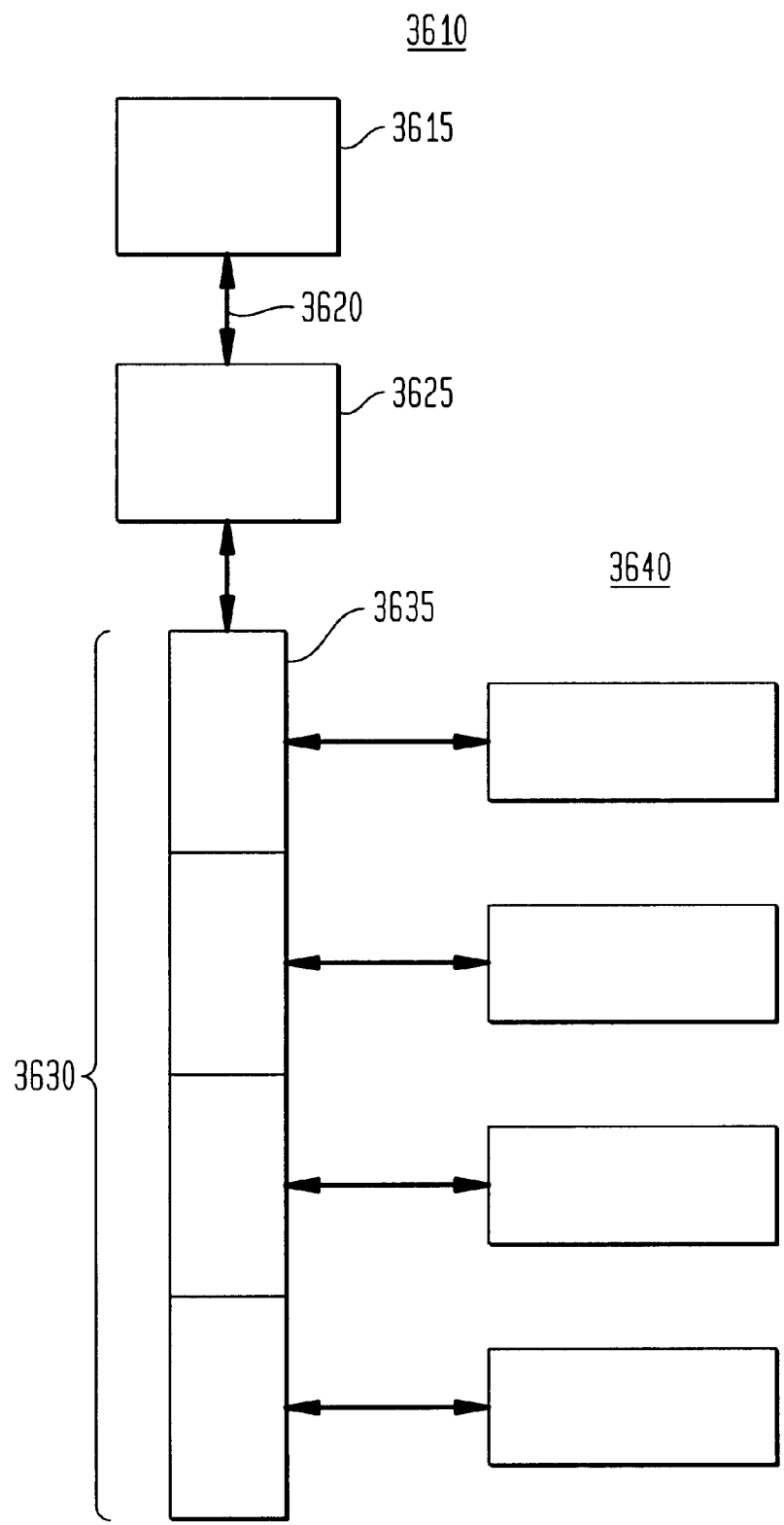
FIG. 36 is a block diagram of a PLC.
Figure 37A:
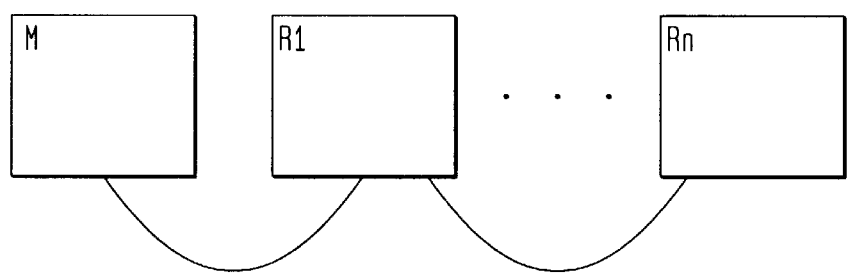
FIG. 37a is a block diagram of a master/slave system.
Figure 37B:
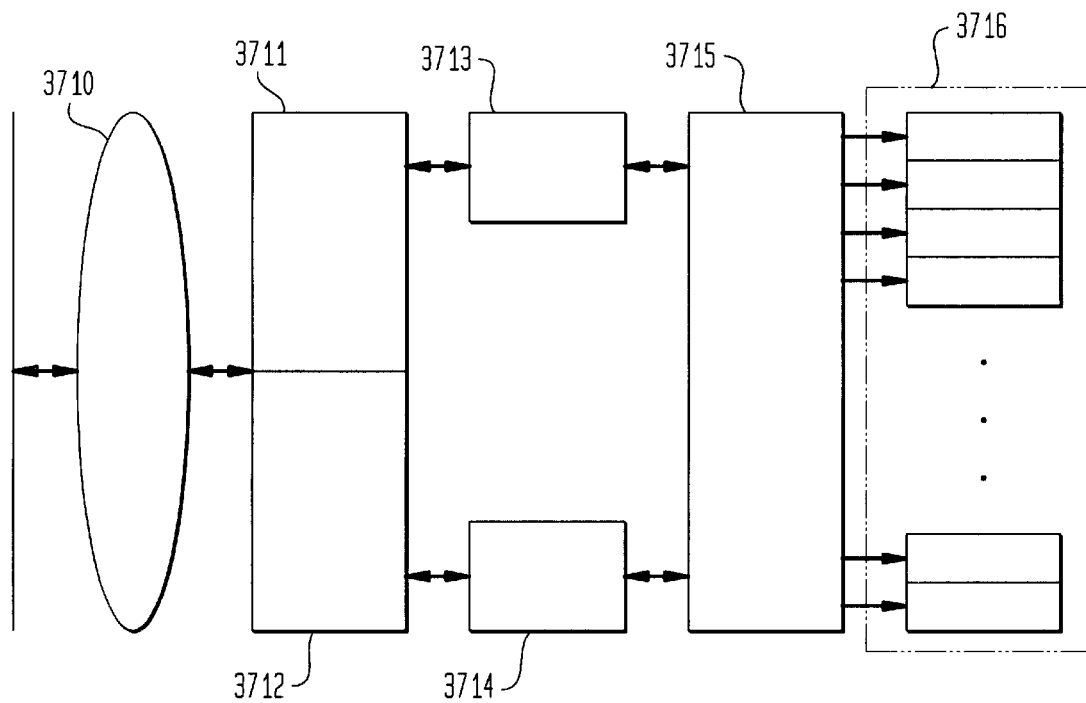
FIG. 37b is a block diagram of communications in the master/slave.

The PLC housing is molded in a uniform plastic and color (Noryl GFN1 SE1Anthrazit 614 Herst N. R. GE 93263). The unit is made up of a top, a base, two access covers, one DIN rail latch, and two sizes of light pipes. All these parts snap together to allow for ease of manufacturing. Provisions in the housing is made to allow the PWB's to also snap into position. The I/O housing is designed in the same manner as the PLC housing. The housing will be designed for IP20 protection and to prevent other objects (such as a coin) from entering the unit. The table in FIG. 35a shows one possible set of dimensions of the units Unit Mounting The PLC 3900 shown in FIG. 35b is designed to be mounted either on a DIN rail 3906 or to be panel mounted 3908. A mounting latch will be used to lock the unit onto a standard type 50022 DIN rail when the unit is to be DIN rail mounted. When the unit is to be panel mounted, mounting holes are provided that accept either a metric M4 or a #8 type screw size. The PLC 3904 is shown here in engagement with the I/O expansion module 3902. A clearance of, for example, 25 mm will be required above and below the unit to allow the user wiring access and to allow for proper cooling of the unit.

While the present invention has been described with reference to specific values and circuit arrangements, it shall be appreciated that other values and circuit arrangements may be substituted for those disclosed which is within the spirit and scope of the present invention. In addition, it will be appreciated that the practitioner will instantly recognize how to implement the software code of the PLC and for that matter will understand that the various software applications may be written in any suitable programming language as well as stored in any suitable recording medium such as non-volatile memory include disc, CD-ROM or DVD, for example.

We claim:

1. An apparatus for a programmable logic controller (PLC) including a pulse catch circuit to capture a change in the state of an input pulse until such a time that said PLC has recognized said change in state even when an update in said input pulse occurs between scan cycles of said PLC, said pulse catch circuit comprising:

an input for receiving said input pulse; and a circuit that sets a flag indicating that said input pulse changed states;

wherein said pulse catch circuit ignores any changes occurring in said input pulse while said flag is set, thereby capturing a change in the state of an input pulse until such a time that said PLC has recognized said change in state even when an update in said input pulse occurs between scan cycles of said PLC.

2. The apparatus of claim 1, wherein said circuit resets said flag when said change in state of said input pulse is recognized by said PLC thereby capturing said change of state and re-enabling said circuit to recognize further state changes in said input pulse.

3. The apparatus of claim 1, further comprising a user interrupt that interrupts said PLC, thereby suspending normal program execution of said PLC such that said change in state of said input pulse is not missed by said pulse catch circuit.

4. The apparatus of claim 1, further comprising a plurality of pulse catch circuits each having components of said pulse catch circuits provided for each integral input of said PLC.

5. The apparatus of claim 4, wherein each of said plurality of pulse catch circuits is individually enabled and disabled.

6. An apparatus for a programmable logic controller (PLC) including a pulse catch circuit to capture a change in the state of an input pulse until such a time that said PLC has recognized said change in state even when an update in said input pulse occurs between scan cycles of said PLC, said pulse catch circuit comprising:

input means for receiving said input pulse; and circuit means for setting a flag indicating that said input pulse changed states;

wherein said pulse catch circuit ignores any changes occurring in said input pulse while said flag is set, thereby capturing a change in the state of an input pulse until such a time that said PLC has recognized said change in state even when an update in said input pulse occurs between scan cycles of said PLC.

7. The apparatus of claim 6, wherein said circuit means resets said flag when said change in state of said input pulse is recognized by said PLC thereby capturing said change of state and re-enabling said circuit to recognize further state changes in said input pulse.

8. The apparatus of claim 6, further comprising user interrupt means for interrupting said PLC, thereby suspending normal program execution of said PLC such that said change in state of said input pulse is not missed by said pulse catch circuit.

9. The apparatus of claim 6, further comprising a plurality of pulse catch circuits each having components of said pulse catch circuits provided for each integral input of said PLC.

10. The apparatus of claim 9, wherein each of said plurality of pulse catch circuits is individually enabled and disabled.

11. A method for a programmable logic controller (PLC) including a pulse catch circuit to capture a change in the state of an input pulse until such a time that said PLC has recognized said change in state even when an update in said input pulse occurs between scan cycles of said PLC, said method comprising the steps of:

receiving said input pulse; and setting a flag indicating that said input pulse changed states;

wherein said pulse catch circuit ignores any changes occurring in said input pulse while said flag is set, thereby capturing a change in the state of an input pulse until such a time that said PLC has recognized said change in state even when an update in said input pulse occurs between scan cycles of said PLC.

12. The method of claim 11, further comprising the step of resetting said flag when said change in state of said input pulse is recognized by said PLC thereby capturing said change of state and re-enabling said circuit to recognize further state changes in said input pulse.

13. The method of claim 11, further comprising the step of interrupting said PLC, thereby suspending normal program execution of said PLC such that said change in state of said input pulse is not missed by said pulse catch circuit.

14. The method of claim 11, wherein said step of setting further comprises the step of setting said flag for each integral input of said PLC.

15. The method of claim 14, further comprising the step of individually enabling and disabling the setting of said flag for each integral input to said PLC.

* * * * *